(12) United States Patent
Nakamura

(10) Patent No.: US 8,995,064 B2
(45) Date of Patent: Mar. 31, 2015

(54) ZOOM LENS, IMAGING APPARATUS, AND METHOD FOR MANUFACTURING ZOOM LENS

(75) Inventor: Keiichi Nakamura, Tokyo (JP)

(73) Assignee: Nikon Corporation, Tokyo (JP)

( * ) Notice: Subject to any disclaimer, the term of this patent is extended or adjusted under 35 U.S.C. 154(b) by 34 days.

(21) Appl. No.: 13/589,156

(22) Filed: Aug. 19, 2012

(65) Prior Publication Data
US 2013/0050843 A1 Feb. 28, 2013

(30) Foreign Application Priority Data

Aug. 22, 2011 (JP) ................................. 2011-180957
Aug. 22, 2011 (JP) ................................. 2011-180958

(51) Int. Cl.
*G02B 15/14* (2006.01)
*G02B 15/173* (2006.01)
*G02B 27/64* (2006.01)

(52) U.S. Cl.
CPC .............. *G02B 15/173* (2013.01); *G02B 15/14* (2013.01); *G02B 27/646* (2013.01)
USPC ........................................................ 359/687

(58) Field of Classification Search
CPC ......... G02B 15/00; G02B 15/14; G02B 15/16
USPC ............................ 359/676, 683, 684, 686, 687
See application file for complete search history.

(56) References Cited

U.S. PATENT DOCUMENTS

| | | | |
|---|---|---|---|
| 7,782,543 B2 * | 8/2010 | Fujisaki | 359/687 |
| 2005/0254137 A1 | 11/2005 | Yamada et al. | |
| 2005/0270661 A1 | 12/2005 | Nanba et al. | |
| 2006/0291070 A1 | 12/2006 | Terada et al. | |
| 2007/0253074 A1 | 11/2007 | Hamano et al. | |
| 2008/0080062 A1 | 4/2008 | Ito | |
| 2008/0212201 A1 | 9/2008 | Sato | |
| 2008/0291547 A1 | 11/2008 | Saruwatari | |
| 2009/0021844 A1 | 1/2009 | Fujisaki | |
| 2009/0185282 A1 | 7/2009 | Ishibashi | |
| 2009/0310226 A1 * | 12/2009 | Sato | 359/676 |
| 2009/0323198 A1 | 12/2009 | Kusaka | |
| 2010/0134901 A1 | 6/2010 | Kimura | |
| 2010/0246025 A1 | 9/2010 | Saito et al. | |
| 2010/0328783 A1 | 12/2010 | Wada | |
| 2011/0157717 A1 | 6/2011 | Nanba | |

(Continued)

FOREIGN PATENT DOCUMENTS

| | | | |
|---|---|---|---|
| JP | 2005-345892 A | 12/2005 | |
| JP | 2006-011469 A | 1/2006 | |
| JP | 2006-113453 A | 4/2006 | |

(Continued)

*Primary Examiner* — Darryl J Collins
(74) *Attorney, Agent, or Firm* — Miles & Stockbridge P.C.

(57) ABSTRACT

Disclosed is a zoom lens having a first lens group G1 having positive refractive power; a second lens group G2 having negative refractive power; a third lens group G3 having positive refractive power; and a fourth lens group G4 having positive refractive power. Upon zooming from a wide-angle end state to a telephoto end state, a distance between the first lens group G1 and the second lens group G2 is changed, a distance between the second lens group G2 and the third lens group G3 is changed, and the fourth lens group G4 is moved toward the object first, then moved toward an image. The third lens group G3 has a first positive lens L31, a negative lens L32 and a second positive lens L33, and the fourth lens group G4 has two lenses: L41 and L42.

25 Claims, 19 Drawing Sheets

(56) References Cited

U.S. PATENT DOCUMENTS

| | | |
|---|---|---|
| 2011/0273774 A1 | 11/2011 | Saruwatari |
| 2012/0013995 A1 | 1/2012 | Saruwatari |

FOREIGN PATENT DOCUMENTS

| | | |
|---|---|---|
| JP | 2006-184416 A | 7/2006 |
| JP | 2006-189598 A | 7/2006 |
| JP | 2007-010695 A | 1/2007 |
| JP | 2007-178825 A | 7/2007 |
| JP | 2007-298555 A | 11/2007 |
| JP | 2008-089690 A | 4/2008 |
| JP | 2008-152288 A | 7/2008 |
| JP | 2008-158418 A | 7/2008 |
| JP | 2008-164725 A | 7/2008 |
| JP | 2008-209741 A | 9/2008 |
| JP | 2008-292733 A | 12/2008 |
| JP | 2009-025366 A | 2/2009 |
| JP | 2009-169249 A | 7/2009 |
| JP | 2009-294513 A | 12/2009 |
| JP | 2010-134081 A | 6/2010 |
| JP | 2010-160242 A | 7/2010 |
| JP | 2010-160243 A | 7/2010 |
| JP | 2010-210776 A | 9/2010 |
| JP | 2010-237455 A | 10/2010 |
| JP | 2011-013281 A | 1/2011 |
| JP | 2011-133740 A | 7/2011 |
| JP | 2011-137903 A | 7/2011 |
| WO | WO 03/071332 A1 | 8/2003 |

\* cited by examiner

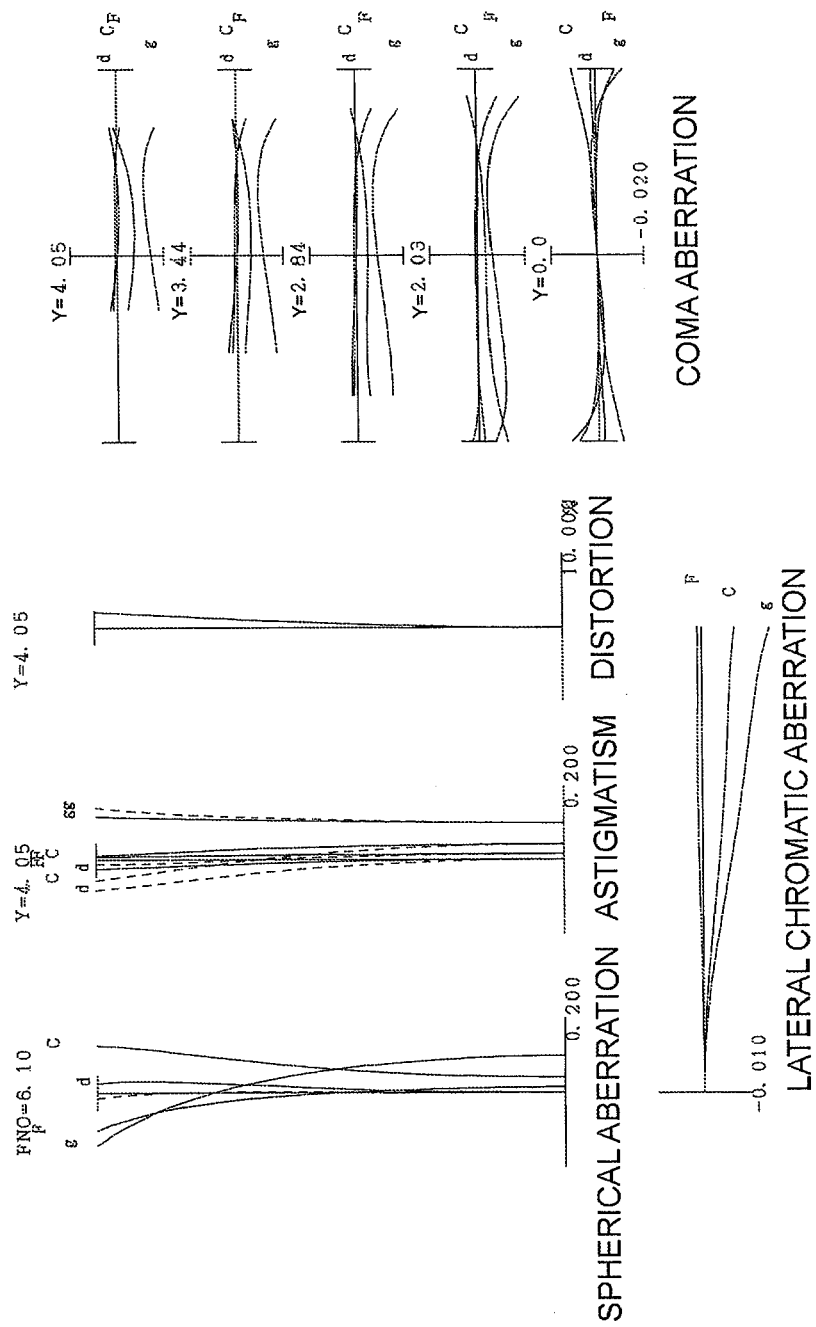

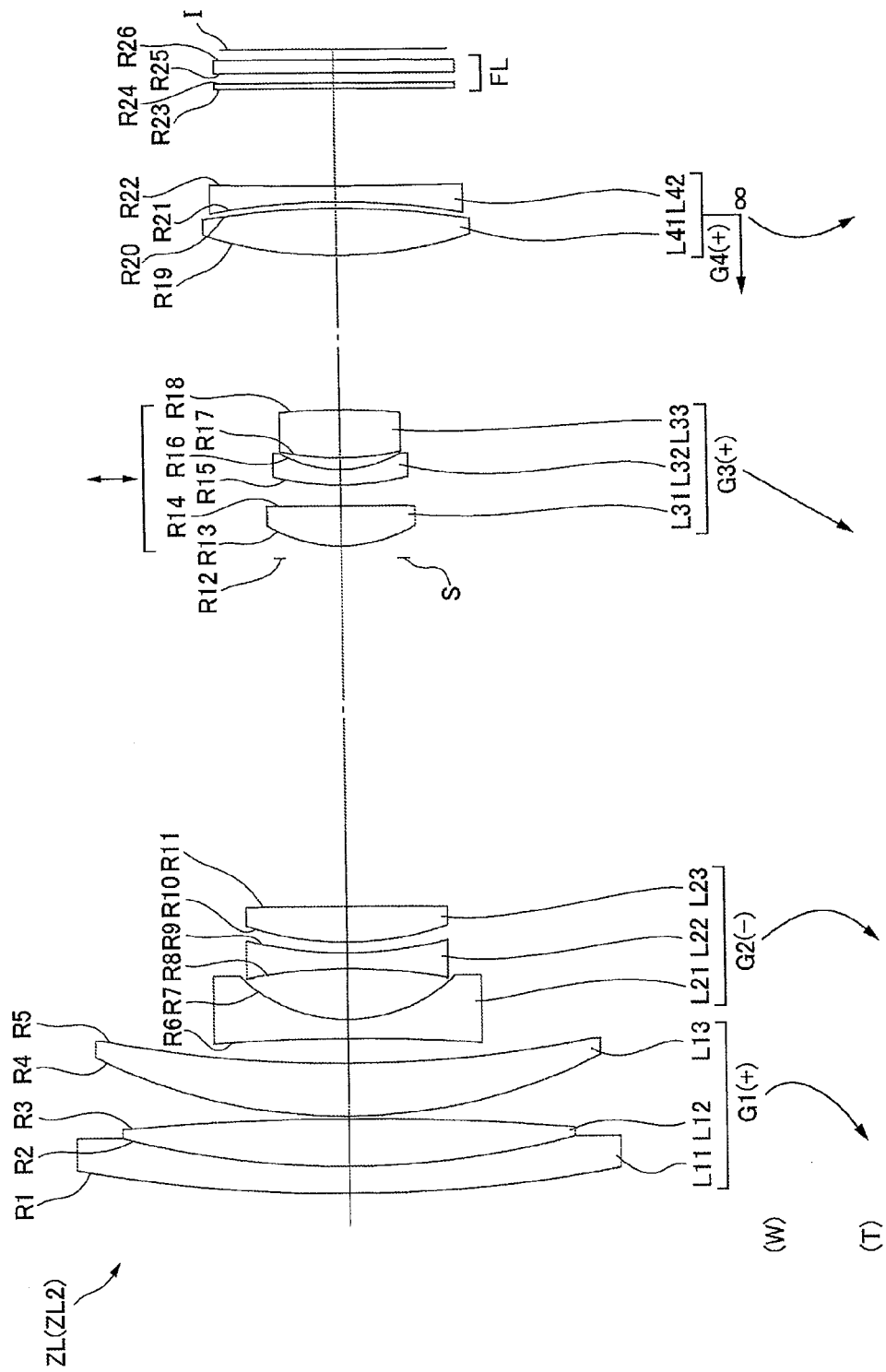

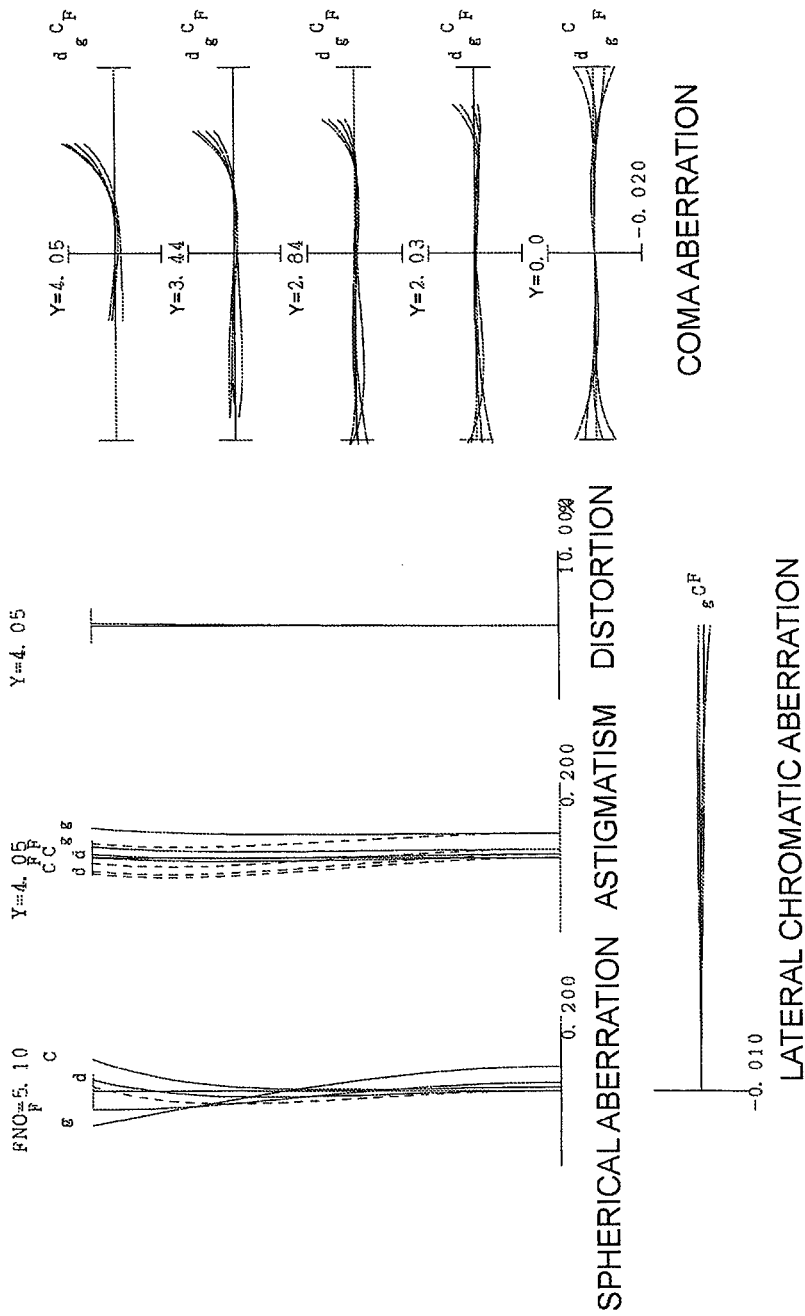

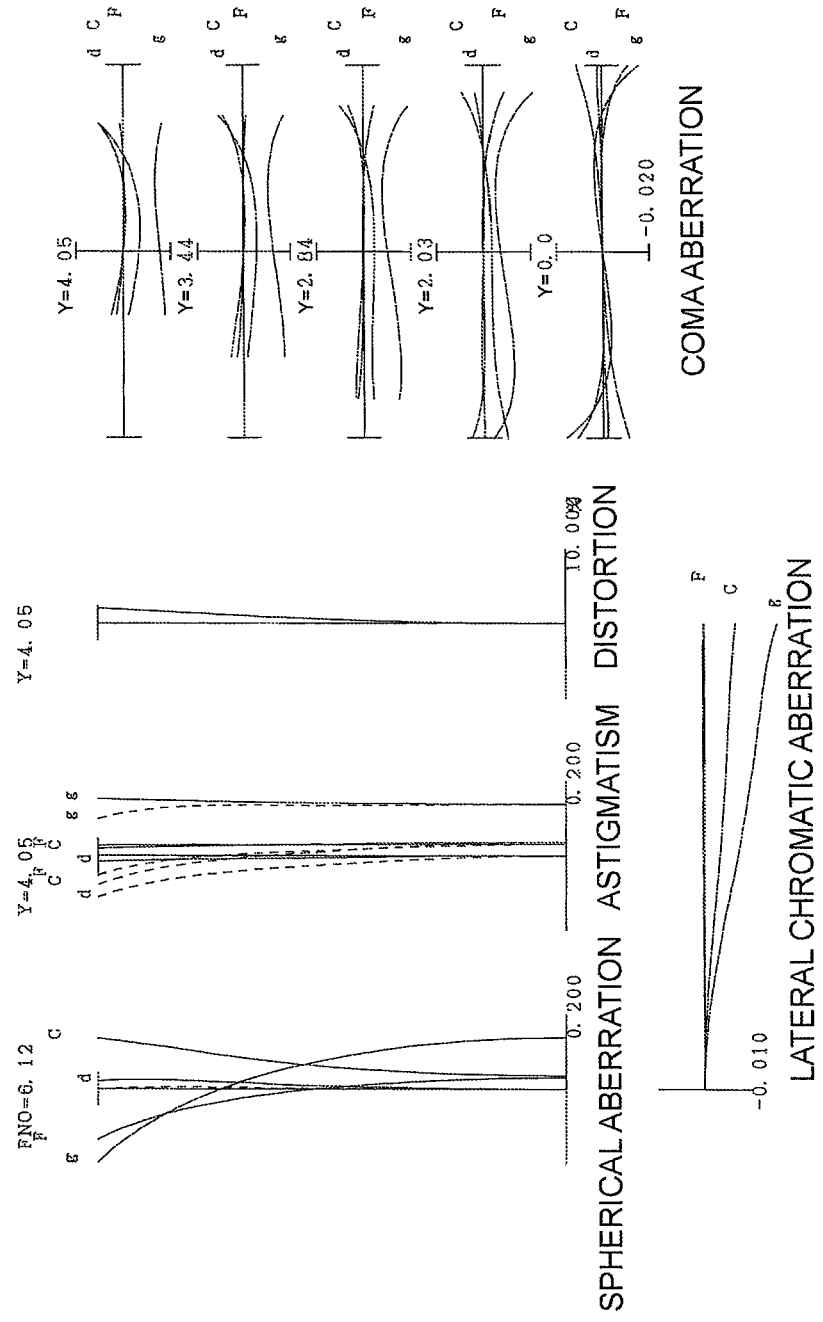

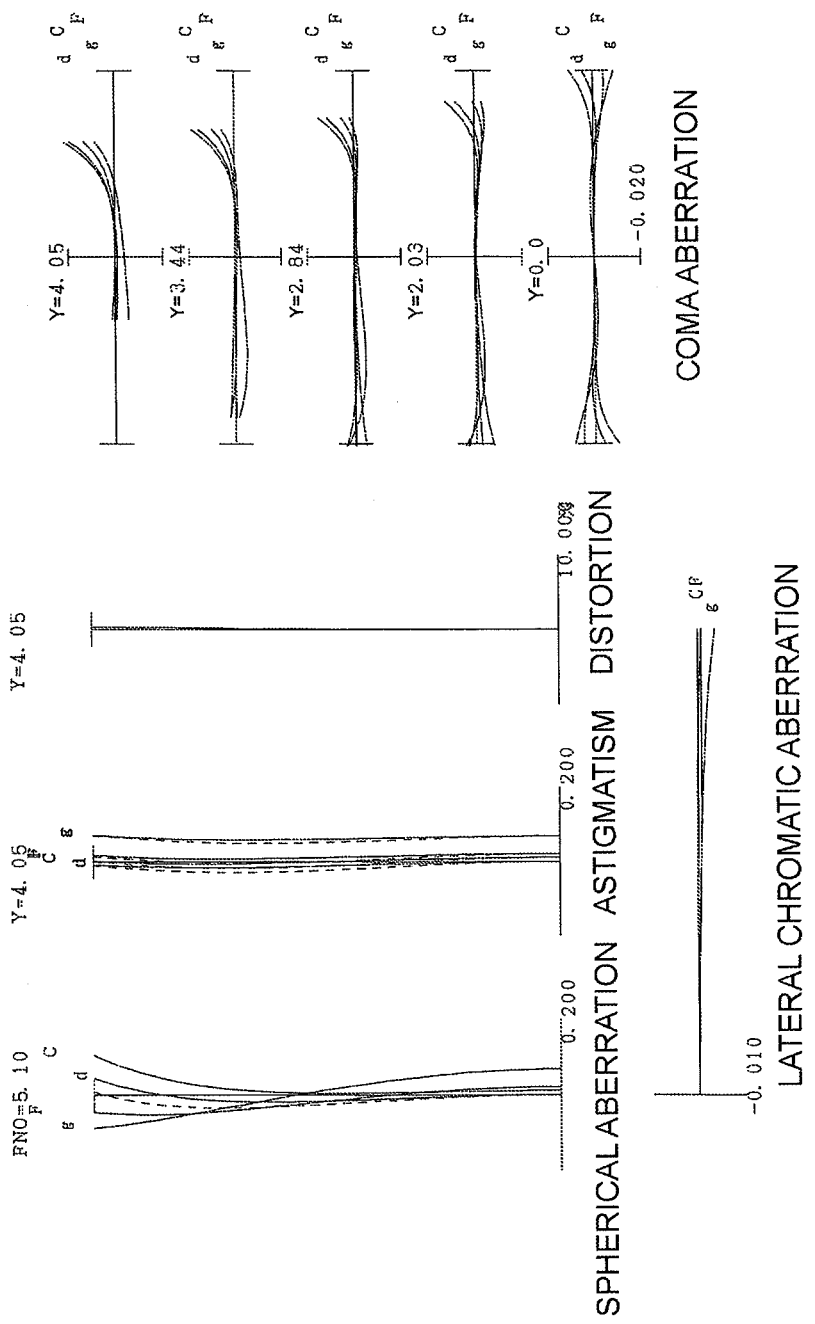

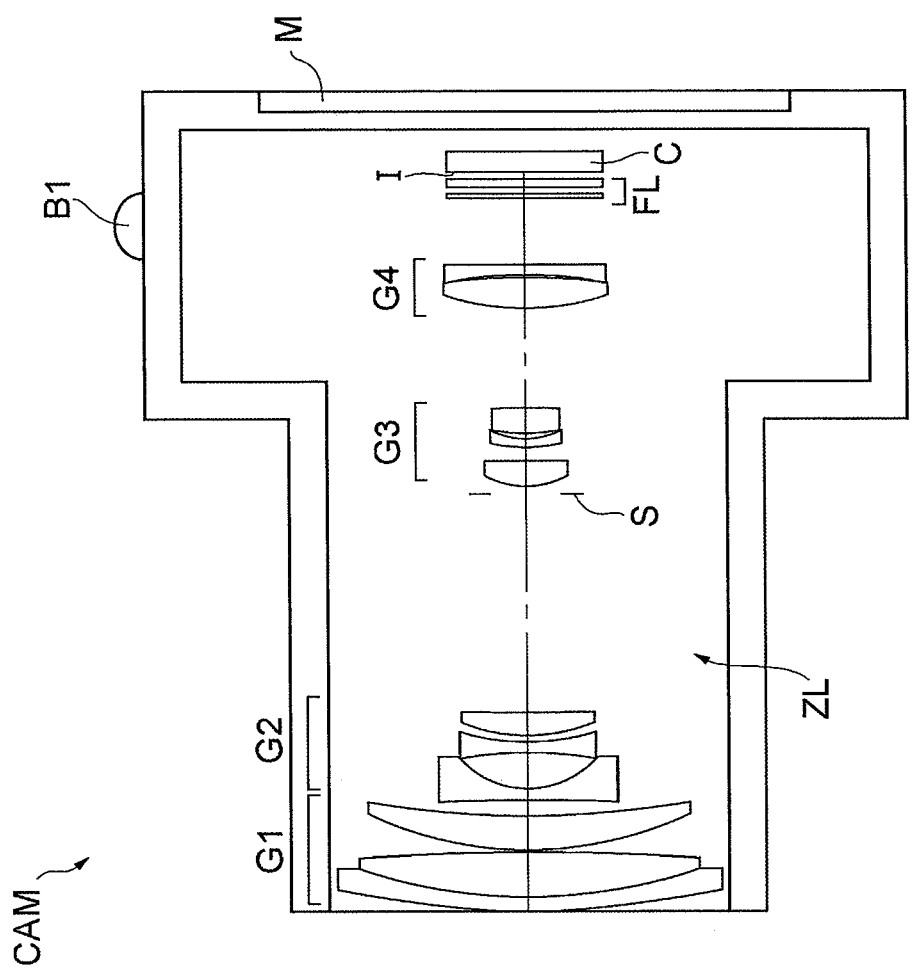

ZOOM LENS, IMAGING APPARATUS, AND METHOD FOR MANUFACTURING ZOOM LENS

RELATED APPLICATION

This invention claims the benefit of Japanese Patent Application Nos. 2011-180957 and 2011-180958 which are hereby incorporated by reference.

TECHNICAL FIELD

The present invention relates to a zoom lens, an imaging apparatus, and a method for manufacturing the zoom lens.

TECHNICAL BACKGROUND

In recent years, higher zoom ratio, higher performance and smaller size are demanded for imaging optical systems, including a video camera and a digital still camera. A zoom lens that is proposed to meet such demands is a zoom lens comprising, in order from an object: a first lens group having positive refractive power; a second lens group having negative refractive power; a third lens group having positive refractive power; and a fourth lens group having positive refractive power, wherein zooming is performed by moving each lens group (e.g. see Japanese Laid-Open Patent Publication No. 2008-152288(A)).

SUMMARY OF THE INVENTION

However a zoom lens that is even more compact and has higher performance is demanded.

With the foregoing in view, it is an object of the present invention to provide a zoom lens that has a compactness and excellent optical performance, even if the zoom ratio is high, an imaging apparatus using the zoom lens, and a method for manufacturing the zoom lens.

To achieve this object, a first zoom lens according to the present invention is a zoom lens comprising, in order from an object: a first lens group having positive refractive power; a second lens group having negative refractive power; a third lens group having positive refractive power; and a fourth lens group having positive refractive power, wherein upon zooming from a wide-angle end state to a telephoto end state, a distance between the first lens group and the second lens group is changed, a distance between the second lens group and the third lens group is changed and the fourth lens group is moved toward the object first, then moved toward an image, the third lens group includes, in order from the object, a first positive lens, a negative lens and a second positive lens, the fourth lens group includes two lens components, and the following conditional expressions are satisfied.

$$2.0 < f3/fw < 3.0$$

$$0.6 < (-f3b)/f3 < 1.0$$

where f3 denotes a focal length of the third lens group, fw denotes a focal length of the zoom lens in the wide-angle end state, and f3b denotes a focal length of the negative lens of the third lens group.

In the first zoom lens, it is preferable that the following conditional expression is satisfied.

$$0.3 < f3/f4 < 0.6$$

Where f3 denotes a focal length of the third lens group, and f4 denotes a focal length of the fourth lens group.

In the first zoom lens, it is preferable that the following conditional expression is satisfied.

$$1.0 < (-f2)/fw < 1.5$$

Where f2 denotes a focal length of the second lens group, and fw denotes a focal length of the zoom lens in the wide-angle end state.

In the first zoom lens, it is preferable that the following conditional expression is satisfied.

$$1.0 < TLt/ft < 1.2$$

Where

TLt denotes a total length of the zoom lens in the telephoto end state, and ft denotes a focal length of the zoom lens in the telephoto end state.

In the first zoom lens, it is preferable that the following conditional expression is satisfied.

$$1.0 < D1/fw < 1.6$$

Where

D1 denotes a thickness of the first lens group on the optical axis, and fw denotes a focal length of the zoom lens in the wide-angle end state.

In the first zoom lens, it is preferable that the following conditional expression is satisfied.

$$1.5 < f3c/f3a < 2.5$$

Where f3c denotes a focal length of the second positive lens of the third lens group, and f3a denotes a focal length of the first positive lens of the third lens group.

In the first zoom lens, it is preferable that the fourth lens group is formed of, in order from the object, a first lens component constituted by a positive lens and a second lens component constituted by a negative lens, and at least one of the positive lens and the negative lens has an aspherical surface.

In the first zoom lens, it is preferable that the following conditional expression is satisfied.

$$0.1 < (-f2)/f1 < 0.2$$

Where f2 denotes a focal length of the second lens group, and f1 denotes a focal length of the first lens group.

In the first zoom lens, it is preferable that the fourth lens group includes a first lens component, and a second lens component that is disposed on the image side of the first lens component via an air space.

In this case, it is also preferable that the following conditional expression is satisfied.

$$-11.5 < (R42a+R41b)/(R42a-R41b) < -3.5$$

Where

R41b denotes a paraxial radius of curvature of a lens surface closest to the image in the first lens component of the fourth lens group, and R42a denotes a paraxial radius of curvature of a lens surface closest to the object in the second lens component of the fourth lens group.

In the first zoom lens, it is preferable that an aperture stop is disposed near the object side of the first positive lens of the third lens group, and the third lens group and the aperture stop move together along the optical axis upon zooming from the wide-angle end state to the telephoto end state.

In the first zoom lens, it is preferable that at least a part of the third lens group can move so as to have a component in a vertical direction with respect to the optical axis.

In the first zoom lens, it is preferable that the fourth lens group moves along the optical axis upon focusing from an object at infinity to an object at a finite distance.

A first imaging apparatus according to the present invention is an imaging apparatus comprising a zoom lens that forms an image of an object on a predetermined surface, and the zoom lens is the first zoom lens according to the present invention.

A second zoom lens according to the present invention is a zoom lens having, in order from an object: a first lens group having positive refractive power; a second lens group having negative refractive power; a third lens group having positive refractive power; and a fourth lens group having positive refractive power, wherein upon zooming from a wide-angle end state to a telephoto end state, a distance between the first lens group and the second lens group is changed, a distance between the second lens group and the third lens group is changed, and the fourth lens group is moved toward the object first, then moved toward an image, the third lens group includes, in order from the object, a first positive lens, a negative lens, and a second positive lens, and the fourth lens group includes a first lens component and a second lens component that is disposed on the image side of the first lens component via an air space.

In the second zoom lens, it is preferable that the following conditional expression is satisfied.

$$-11.5 < (R42a + R41b)/(R42a - R41b) < -3.5$$

Where

R41b denotes a paraxial radius of curvature of a lens surface closest to the image in the first lens component of the fourth lens group, and R42a denotes a paraxial radius of curvature of a lens surface closest to the object in the second lens component of the fourth lens group.

In the second zoom lens, it is preferable that the following conditional expression is satisfied.

$$2.0 < f3/fw < 3.0$$

Where f3 denotes a focal length of the third lens group, and fw denotes a focal length of the zoom lens in the wide-angle end state.

In the second zoom lens, it is preferable that the following conditional expression is satisfied.

$$0.6 < (-f3b)/f3 < 1.0$$

Where f3 denotes a focal length of the third lens group, and f3b denotes a focal length of the negative lens of the third lens group.

A second imaging apparatus according to the present invention is an imaging apparatus comprising a zoom lens that forms an image of an object on a predetermined surface, and the zoom lens is the second zoom lens according to the present invention.

A first method for manufacturing a zoom lens according to the present invention is a method for manufacturing a zoom lens having, in order from an object: a first lens group having positive refractive power; a second lens group having negative refractive power; a third lens group having positive refractive power; and a fourth lens group having positive refractive power, wherein upon zooming from a wide-angle end state to a telephoto end state, a distance between the first lens group and the second lens group is changed, a distance between the second lens group and the third lens group is changed and the fourth lens group is moved toward the object first, then moved toward an image, the third lens group includes, in order from the object, a first positive lens, a negative lens and a second positive lens, the fourth lens group includes two lens components, and the following conditional expressions are satisfied.

$$2.0 < f3/fw < 3.0$$

$$0.6 < (-f3b)/f3 < 1.0$$

Where f3 denotes a focal length of the third lens group, fw denotes a focal length of the zoom lens in the wide-angle end state, and f3b denotes a focal length of the negative lens of the third lens group.

In the first method for manufacturing the zoom lens, it is preferable that the following conditional expression is satisfied.

$$0.3 < f3/f4 < 0.6$$

Where f3 denotes a focal length of the third lens group, and f4 denotes a focal length of the fourth lens group.

In the first method for manufacturing the zoom lens, it is preferable that the following conditional expression is satisfied.

$$1.0 < (-f2)/fw < 1.5$$

Where f2 denotes a focal length of the second lens group, and fw denotes a focal length of the zoom lens in the wide-angle end state.

In the first method for manufacturing the zoom lens, it is preferable that the fourth lens group includes a first lens component, and a second lens component that is disposed on the image side of the first lens component via an air space.

A second method for manufacturing a zoom lens is a method for manufacturing a zoom lens having, in order from an object: a first lens group having positive refractive power; a second lens group having negative refractive power; a third lens group having positive refractive power; and a fourth lens group having positive refractive power, wherein upon zooming from a wide-angle end state to a telephoto end state, a distance between the first lens group and the second lens group is changed, a distance between the second lens group and the third lens group is changed, and the fourth lens group is moved toward the object first, then moved toward an image, the third lens group includes, in order from the object, a first positive lens, a negative lens, and a second positive lens, and the fourth lens group includes a first lens component and a second lens component that is disposed on the image side of the first lens component via an air space.

In the second method for manufacturing the zoom lens, it is preferable that the following conditional expression is satisfied.

$$-11.5 < (R42a + R41b)/(R42a - R41b) < -3.5$$

where R41b denotes a paraxial radius of curvature of a lens surface closest to the image in the first lens component of the fourth lens group, and R42a denotes a paraxial radius of curvature of a lens surface closest to the object in the second lens component of the fourth lens group.

According to the present invention, a compactness and excellent optical performance can be implemented even if the zoom ratio is high.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 3 shows a cross-section and a zoom locus of a zoom lens according to Example 2;

FIG. 10 is a cross-sectional view along a line indicated by the arrows A and A' in FIG. 9A.

DESCRIPTION OF THE EMBODIMENTS

Figure 9A:
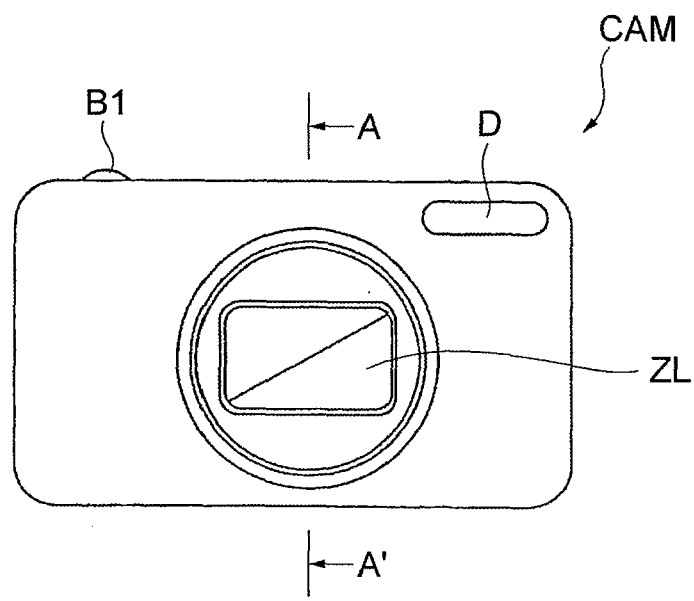
FIG. 9A is a front view of a digital still camera.
Figure 9B:
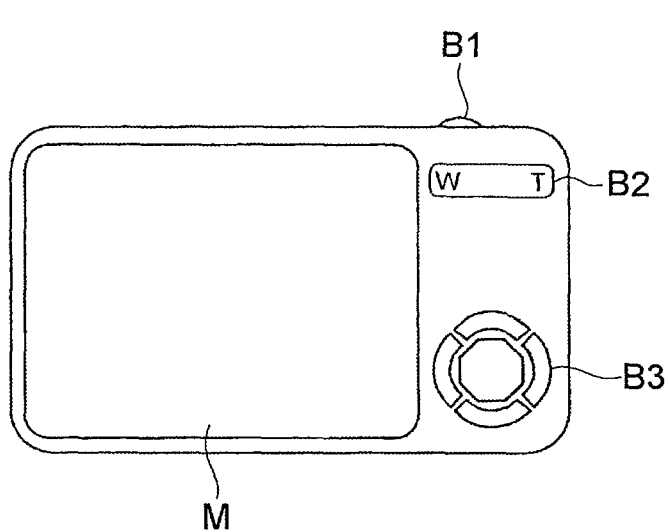
FIG. 9B is a rear view of the digital still camera.

Embodiments of the present invention will now be described with reference to the drawings. FIG. 9 and FIG. 10 show a digital still camera CAM with a zoom lens according to the present invention. FIG. 9A shows a front view of the digital still camera CAM, and FIG. 9B shows a rear view of the digital still camera CAM. FIG. 10 is a cross-sectional view along a line indicated by the arrows A and A' in FIG. 9A.

If a power button (not illustrated) is pressed on the digital still camera CAM shown in FIG. 9 and FIG. 10, a shutter (not illustrated) of an image capturing lens (Z) is released, and lights from an object are collected by the image capturing lens (ZL) and form an image on a picture element C (not illustrated) (e.g. CCD and CMOS), which is disposed on an image plane I. The object image formed on the picture element C is displayed on a liquid crystal monitor M disposed on the back of the digital still camera CAM. The user determines the composition of the object image while viewing the liquid crystal monitor M, then presses a release button B1 to capture the object image by the picture element C, and stores it in memory (not illustrated).

The image capturing lens is constituted by a later mentioned zoom lens ZL according to the embodiment. The digital still camera CAM has an auxiliary light emitting unit D, which emits auxiliary light when the object is dark, a wide (W) tele (T) button B2 for zooming the image capturing lens (zoom lens ZL) from a wide-angle end state (W) to a telephoto end state (T), and a function button B3, which is used for setting various conditions for the digital still camera CAM.

A zoom lens ZL according to a first embodiment is, for example, a zoom lens comprising, in order from an object, a first lens group G1 having positive refractive power, a second lens group G2 having negative refractive power, a third lens group G3 having positive refractive power and a fourth lens group G4 having positive refractive power. Upon zooming from a wide-angle end state to a telephoto end state, a distance between the first lens group G1 and the second lens group G2 changes, a distance between the second lens group G2 and the third lens group G3 changes, and the fourth lens group G4 moves toward the object first, then moves toward an image. The third lens group G3 includes, in order from the object, a first positive lens, a negative lens and a second positive lens. The fourth lens group G4 includes two lens components.

In the zoom lens ZL having this configuration, it is preferable that the following conditional expression (1) and conditional expression (2) are satisfied.

$$2.0 < f3/fw < 3.0 \quad (1)$$

$$0.6 < (-f3b)/f3 < 1.0 \quad (2)$$

where f3 denotes a focal length of the third lens group G3, fw denotes a focal length of the zoom lens ZL in the wide-angle end state, and f3b denotes a focal length of the negative lens of the third lens group G3.

The conditional expression (1) specifies a relationship between the focal length of the third lens group G3 and the focal length of the zoom lens ZL in the wide-angle end state. Spherical aberration and fluctuations of aberrations due to zooming can be controlled by satisfying these conditional expressions. If the upper limit value of the conditional expression (1) is exceeded, power of the third lens group G3 becomes too weak, which makes it difficult to correct coma aberration. Furthermore, the total length of the zoom lens increases because the moving distance of the lens increases upon zooming, which makes it impossible to implement compactness. If the lower limit value of the conditional expression (1) is not reached, power of the third lens group G3 becomes too strong, and spherical aberration in the telephone end state is excessively corrected by the third lens group G3, which makes it difficult to correct coma aberration and curvature of field.

To demonstrate the effect of the first embodiment well, it is preferable that the upper limit value of the conditional expression (1) is 2.7. It is even better that the upper limit value of the conditional expression (1) is 2.5. To demonstrate the effect of the first embodiment well, it is preferable that the lower limit value of the conditional expression (1) is 2.05. It is even better that the lower limit value of the conditional expression (1) is 2.1.

The conditional expression (2) specifies the focal length of the negative lens in the third lens group G3. If the upper limit value of the conditional expression (2) is exceeded, power of the negative lens in the third lens group G3 becomes weak, which makes it difficult to correct spherical aberration, coma aberration and astigmatism. If the lower limit value of the conditional expression (2) is not reached, power of the entire third lens group G3 becomes weak, which makes it difficult to correct spherical aberration. Furthermore, power of the negative lens of the third lens group G3 becomes strong, which makes it difficult to correct coma aberration.

To demonstrate the effect of the first embodiment well, it is preferable that the upper limit value of the conditional expression (2) is 0.9. It is even better that the upper limit value of the conditional expression (2) is 0.8. To demonstrate the effect of the first embodiment well, it is preferable that the lower limit value of the conditional expression (2) is 0.605. It is even better that the lower limit value of the conditional expression (2) is 0.61.

In the zoom lens ZL according to the first embodiment, it is preferable that the following conditional expression (3) is satisfied.

$$0.3 < f3/f4 < 0.6 \tag{3}$$

where f3 denotes a focal length of the third lens group G3, and f4 denotes a focal length of the fourth lens group G4.

The conditional expression (3) specifies a relationship between the focal length of the third lens group G3 and the focal length of the fourth lens group G4. If the upper limit value of the conditional expression (3) is exceeded, power of the fourth lens group G4 becomes too strong, which makes it difficult to correct spherical aberration and longitudinal chromatic aberration in the telephoto end state. Furthermore, the total length of the zoom lens increases because the moving distance of the third lens group G3 increases upon zooming, which makes it impossible to implement compactness. If the lower limit value of the conditional expression (3) is not reached, power of the fourth lens group G4 becomes too weak, which makes it difficult to correct curvature of field and coma aberration in the wide-angle end state, and coma aberration in the telephoto end state.

To demonstrate the effect of the first embodiment well, it is preferable that the upper limit value of the conditional expression (3) is 0.5. It is even better that the upper limit value of the conditional expression (3) is 0.45. To demonstrate the effect of the first embodiment well, it is preferable that the lower limit value of the conditional expression (3) is 0.31. It is even better that the lower limit value of the conditional expression (3) is 0.33.

In the zoom lens ZL according to the first embodiment, it is preferable that the following conditional expression (4) is satisfied.

$$1.0 < (-f2)/fw < 1.5 \tag{4}$$

where f2 denotes a focal length of the second lens group G2, and fw denotes a focal length of the zoom lens ZL in the wide-angle end state.

The conditional expression (4) specifies a relationship between the focal length of the second lens group G2 and the focal length of the zoom lens ZL in the wide-angle end state. If the upper limit value of the conditional expression (4) is exceeded, power of the second lens group G2 becomes too weak, hence power of the other lens groups must be increased, which makes it difficult to correct spherical aberration and curvature of field. Furthermore, the total length of the zoom lens increases, and the front lens diameter increases as well, because the moving distance of the lens increases upon zooming, which makes it impossible to implement compactness. If the lower limit value of the conditional expression (4) is not reached, power of the second lens group G2 becomes strong, which decreases the moving distance but makes it difficult to correct astigmatism and curvature of field.

To demonstrate the effect of the first embodiment well, it is preferable that the upper limit value of the conditional expression (4) is 1.4. It is even better that the upper limit value of the conditional expression (4) is 1.35. To demonstrate the effect of the first embodiment well, it is preferable that the lower limit value of the conditional expression (4) is 1.05. It is even better that the lower limit value of the conditional expression (4) is 1.1.

In the zoom lens ZL according to the first embodiment, it is preferable that the following conditional expression (5) is satisfied.

$$1.0 < TLt/ft < 1.2 \tag{5}$$

where TLt denotes a total length of the zoom lens ZL in the telephoto end state, and ft denotes a focal length of the zoom lens ZL in the telephoto end state.

The conditional expression (5) specifies a total length of the zoom lens ZL in the telephoto end state. If the upper limit value of the conditional expression (5) is exceeded, the total length becomes too long, which makes it impossible to implement compactness. If power of the third lens group G3 is increased to relax this problem, it becomes difficult to correct spherical aberration and chromatic aberration. If the lower limit value of the conditional expression (5) is not reached, power of the first lens group G1 becomes too strong, which makes it difficult to correct curvature of field.

To demonstrate the effect of the first embodiment well, it is preferable that the upper limit value of the conditional expression (5) is 1.18. It is even better that the upper limit value of the conditional expression (5) is 1.17. To demonstrate the effect of the first embodiment well, it is preferable that the lower limit value of the conditional expression (5) is 1.02. It is even better that the lower limit value of the conditional expression (5) is 1.05.

In the zoom lens ZL according to the first embodiment, it is preferable that the following conditional expression (6) is satisfied.

$$1.0 < D1/fw < 1.6 \tag{6}$$

where D1 denotes a thickness of the first lens group G1 on the optical axis, and fw denotes a focal length of the zoom lens ZL in the wide-angle end state.

The conditional expression (6) specifies a thickness of the first lens group G1 on the optical axis. If the upper limit value of the conditional expression (6) is exceeded, the thickness of the first lens group G1 becomes too thick, and the zoom lens in a retracted state cannot be compact, and correction of astigmatism and curvature of field becomes difficult. If the lower limit value of the conditional expression (6) is not reached, thickness of the zoom lens in the retracted state becomes thin, but correction of the longitudinal chromatic aberration becomes difficult due to the change of the refractive index, and correction of astigmatism and curvature of field in the wide-angle end state becomes difficult.

To demonstrate the effect of the first embodiment well, it is preferable that the upper limit value of the conditional expression (6) is 1.4. It is even better that the upper limit value of the conditional expression (6) is 1.3. To demonstrate the effect of the first embodiment well, it is preferable that the lower limit value of the conditional expression (6) is 1.02. It is even better that the lower limit value of the conditional expression (6) is 1.05.

In the zoom lens ZL according to the first embodiment, it is preferable that the following conditional expression (7) is satisfied.

$$1.5 < f3c/f3a < 2.5 \qquad (7)$$

where f3c denotes a focal length of the second positive lens of the third lens group G3, and f3a denotes a focal length of the first positive lens of the third lens group G3.

The conditional expression (7) specifies a relationship between the focal length of the front side positive lens (first positive lens) and that of the rear side positive lens (second positive lens) of the third lens group G3. If the upper limit value of the conditional expression (7) is exceeded, power of the front side positive lens becomes strong, which makes it easy to correct spherical aberration, but power of the rear side positive lens becomes weak, which makes it difficult to correct coma aberration. If the lower limit value of the conditional expression (7) is not reached, power of the front side positive lens becomes weak, which makes it difficult to correct spherical aberration.

To demonstrate the effect of the first embodiment well, it is preferable that the upper limit value of the conditional expression (7) is 2.495. It is even better that the upper limit value of the conditional expression (7) is 2.492. To demonstrate the effect of the first embodiment well, it is preferable that the lower limit value of the conditional expression (7) is 1.6. It is even better that the lower limit value of the conditional expression (7) is 1.8

In the zoom lens ZL according to the first embodiment, it is preferable that the fourth lens group G4 includes, in order from the object, a first lens component that is constituted by a positive lens, and a second lens component that is constituted by a negative lens, and at least one of the positive lens and the negative lens has an aspherical surface. Thereby abaxial astigmatism, coma aberration and curvature of field can be corrected well.

In the zoom lens ZL according to the first embodiment, it is preferable that the following conditional expression (8) is satisfied.

$$0.1 < (-f2)/f1 < 0.2 \qquad (8)$$

where f2 denotes a focal length of the second lens group G2, and f1 denotes a focal length of the first lens group G1.

The conditional expression (8) specifies a relationship between a focal length of the first lens group G1 and that of the second lens group G2. If the upper limit value of the conditional expression (8) is exceeded, power of the first lens group G1 becomes strong, which makes it difficult to correct spherical aberration in the telephoto end state. Power of the second lens group G2 becomes weak, and total length increases because the moving distance of the lens increases upon zooming. If the lower limit value of the conditional expression (8) is not reached, power of the second lens group G2 becomes too strong, which makes it difficult to correct astigmatism and curvature of field.

To demonstrate the effect of the first embodiment well, it is preferable that the upper limit value of the conditional expression (8) is 0.18. It is even better that the upper limit value of the conditional expression (8) is 0.16. To demonstrate the effect of the first embodiment well, it is preferable that the lower limit value of the conditional expression (8) is 0.12. It is even better that the lower limit value of the conditional expression (8) is 0.14.

In the zoom lens ZL according to the first embodiment, it is preferable that the fourth lens group G4 includes a first lens component, and a second lens component that is disposed on the image side of the first lens component via an air space. Since there is the air space between the first lens component and the second lens component of the fourth lens group G4, coma aberration can be effectively corrected in the intermediate area to the telephoto end state. In the case of cementing the first lens component and the second lens component, there is one more surface that is free, which is advantageous to correct aberrations for peripheral image height in the telephoto area.

In this case, it is preferable that the following conditional expression (9) is satisfied.

$$-11.5 < (R42a + R41b)/(R42a - R41b) < -3.5 \qquad (9)$$

where R41b denotes a paraxial radius of curvature of a lens surface closest to the image in the first lens component of the fourth lens group G4, and R42a denotes a paraxial radius of curvature of a lens surface closest to the object in the second lens component of the fourth lens group G4.

The conditional expression (9) specifies a shape factor of an air lens between the two lenses of the fourth lens group G4. If the upper limit value of the conditional expression (9) is exceeded, power of the first lens component of the fourth lens group G4 becomes weak, which makes it difficult to correct coma aberration and astigmatism in the telephoto end state. If the lower limit value of the conditional expression (9) is not reached, power of the first lens component of the fourth lens group G4 becomes too strong, which makes it difficult to correct coma aberration in the intermediate area to the telephoto end state. Correction of lateral chromatic aberration in the telephoto side also becomes difficult.

To demonstrate the effect of the first embodiment well, it is preferable that the upper limit value of the conditional expression (9) is −3.6. It is even better that the upper limit value of the conditional expression (9) is −3.7. To demonstrate the effect of the first embodiment well, it is preferable that the lower limit value of the conditional expression (9) is −11.4. It is even better that the lower limit value of the conditional expression (9) is −11.3.

According to the first embodiment, a zoom lens ZL that has compactness and excellent optical performance, even if the zoom ratio is high, and an imaging apparatus (digital still camera CAM) having this zoom lens ZL, can be implemented.

It is preferable that an aperture stop S is disposed near the object side of the first positive lens of the third lens group G3, and the third lens group G3 and the aperture stop S move together along the optical axis upon zooming from the wide-angle end state to the telephoto end state.

It is preferable that at least a part of the third lens group G3 can move so as to have a component in a vertical direction to the optical axis.

It is preferable that the fourth lens group G4 moves along the optical axis upon focusing from an object at infinity to an object at a finite distance.

Figure 11:
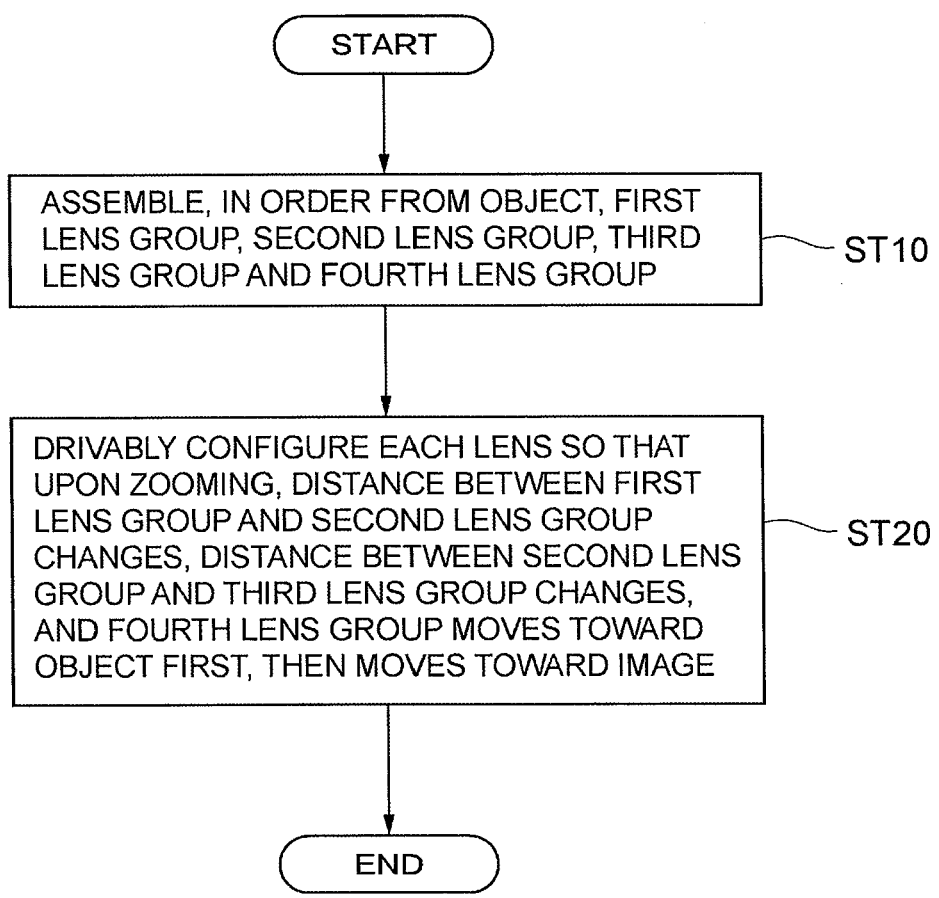
FIG. 11 is a flow chart depicting a method for manufacturing the zoom lens.

A method for manufacturing the zoom lens ZL according to the first embodiment will now be described with reference to FIG. 11. First the first lens group G1, the second lens group G2, the third lens group G3 and the fourth lens group G4 are assembled, in order from the object, in a cylindrical lens barrel (step ST10). Each lens is driveably constituted so that upon zooming from the wide-angle end state to the telephoto end state, the distance between the first lens group G1 and the second lens group G2 changes, the distance between the second lens group G2 and the third lens group G3 changes, and the fourth lens group G4 moves toward the object first, then moves toward an image (step ST20).

In step ST10 in which the lenses are assembled, each lens is disposed so that the first lens group G1 has positive refractive power, the second lens group G2 has negative refractive power, the third lens group G3 has positive refractive power, and the fourth lens group G4 has positive refractive power. For the third lens group G3, the first positive lens, the negative lens and the second positive lens are disposed in order from the object. For the fourth lens group G4, the two lens components are disposed. Each lens is disposed so as to satisfy the above mentioned conditional expression (1) and conditional expression (2) among others. According to this manufacturing method, the mechanical mechanism can be simplified, and the zoom lens ZL that has compactness and excellent optical performance, even if the zoom ratio is high, can be implemented.

Figure 1:
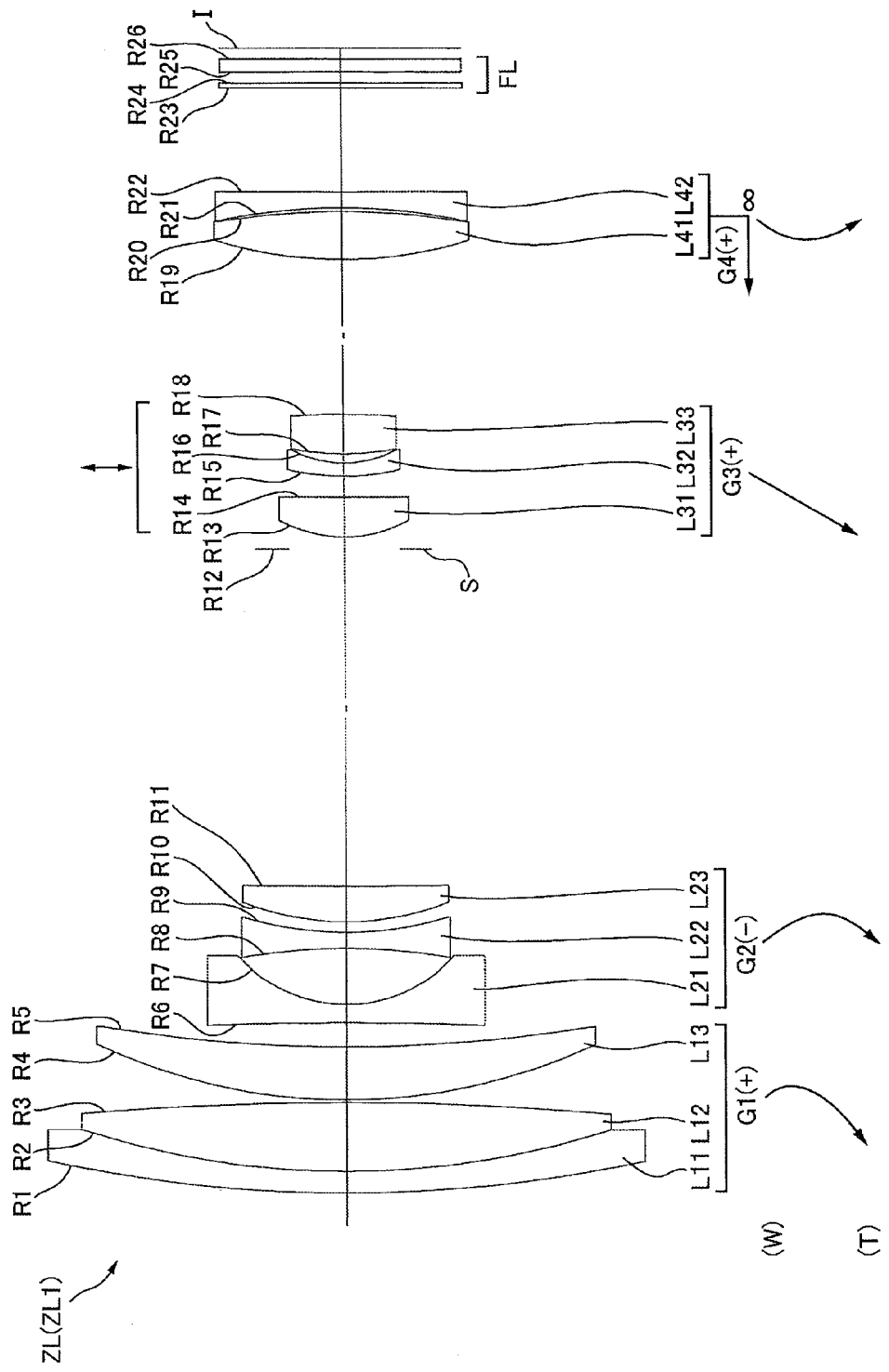
FIG. 1 shows a cross-section and a zoom locus of a zoom lens according to Example 1.

The second embodiment of the present invention will now be described. A zoom lens ZL according to the second embodiment has a similar configuration as the zoom lens ZL according to the first embodiment, and comprises, in order from an object, a first lens group G1 having positive refractive power, a second lens group G2 having negative refractive power, a third lens group G3 having positive refractive power and a fourth lens group G4 having positive refractive power, as shown in FIG. 1. Upon zooming from a wide-angle end state to a telephoto end state, a distance between the first lens group G1 and the second lens group G2 changes, the second lens group G2 and the third lens group G3 changes, and the fourth lens group G4 moves toward the object first, then moves toward an image. The third lens group G3 further comprises, in order from the object, a first positive lens, a negative lens and a second positive lens. The fourth lens group G4 has a first lens component, and a second lens component that is disposed on the image side of the first lens component via an air space.

In the zoom lens ZL having this configuration, there is an air space between the first lens component and the second lens component of the fourth lens group G4, hence coma aberration can be effectively corrected in the intermediate area to the telephoto end state. In the case of cementing the first lens component and the second lens component, there is one more surface that is free, which is advantageous to correct aberrations for the peripheral image height in the telephoto area.

In the zoom lens ZL according to the second embodiment, it is preferable that the above mentioned conditional expression (9) is satisfied. Thereby a similar effect as the first embodiment can be Implemented. To demonstrate the effect of the second embodiment well, it is preferable that the upper limit value of the conditional expression (9) is −3.6. It is even better that the upper limit value of the conditional expression (9) is −3.7. To demonstrate the effect of the second embodiment well, it is preferable that the lower limit value of the conditional expression (9) is −11.4. It is even better that the lower limit value of the conditional expression (9) is −11.3.

In the zoom lens ZL according to the second embodiment, it is preferable that the above mentioned conditional expression (1) is satisfied. Thereby a similar effect as the first embodiment can be Implemented. To demonstrate the effect of the second embodiment well, it is preferable that the upper limit value of the conditional expression (1) is 2.7. It is even better that the upper limit value of the conditional expression (1) is 2.5. To demonstrate the effect of the second embodiment well, it is preferable that the lower limit value of the conditional expression (1) is 2.05. It is even better that the lower limit value of the conditional expression (1) is 2.1.

In the zoom lens ZL according to the second embodiment, it is preferable that the above mentioned conditional expression (2) is satisfied. Thereby a similar effect as the first embodiment can be Implemented. To demonstrate the effect of the second embodiment well, it is preferable that the upper limit value of the conditional expression (2) is 0.9. It is even better that the upper limit value of the conditional expression (2) is 0.8. To demonstrate the effect of the second embodiment well, it is preferable that the lower limit value of the conditional expression (2) is 0.605. It is even better that the lower limit value of the conditional expression (2) is 0.61.

In the zoom lens ZL according to the second embodiment, it is preferable that the above mentioned conditional expression (3) is satisfied. Thereby a similar effect as the first embodiment can be implemented. To demonstrate the effect of the second embodiment well, it is preferable that the upper limit value of the conditional expression (3) is 0.5. It is even better that the upper limit value of the conditional expression (3) is 0.45. To demonstrate the effect of the second embodiment well, it is preferable that the lower limit value of the conditional expression (3) is 0.31. It is even better that the lower limit value of the conditional expression (3) is 0.33.

In the zoom lens ZL according to the second embodiment, it is preferable that the above mentioned conditional expression (4) is satisfied. Thereby a similar effect as the first embodiment can be implemented. To demonstrate the effect of the second embodiment well, it is preferable that the upper limit value of the conditional expression (4) is 1.4. It is even better that the upper limit value of the conditional expression (4) is 1.35. To demonstrate the effect of the second embodiment well, it is preferable that the lower limit value of the conditional expression (4) is 1.05. It is even better that the lower limit value of the conditional expression (4) is 1.1.

In the zoom lens ZL according to the second embodiment, it is preferable that the above mentioned conditional expression (5) is satisfied. Thereby a similar effect as the first embodiment can be implemented. To demonstrate the effect of the second embodiment well, it is preferable that the upper limit value of the conditional expression (5) is 1.18. It is even better that the upper limit value of the conditional expression (5) is 1.17. To demonstrate the effect of the second embodiment well, it is preferable that the lower limit value of the conditional expression (5) is 1.02. It is even better that the lower limit value of the conditional expression (5) is 1.05.

In the zoom lens ZL according to the second embodiment, it is preferable that the above mentioned conditional expression (6) is satisfied. Thereby a similar effect as the first embodiment can be implemented. To demonstrate the effect of the second embodiment well, it is preferable that the upper limit value of the conditional expression (6) is 1.4. It is even better that the upper limit value of the conditional expression (6) is 1.3. To demonstrate the effect of the second embodiment well, it is preferable that the lower limit value of the conditional expression (6) is 1.02. It is even better that the lower limit value of the conditional expression (6) is 1.05.

In the zoom lens ZL according to the second embodiment, it is preferable that the above mentioned conditional expression (7) is satisfied. Thereby a similar effect as the first embodiment can be implemented. To demonstrate the effect of the second embodiment well, it is preferable that the upper limit value of the conditional expression (7) is 2.495. It is even better that the upper limit value of the conditional expression (7) is 2.492. To demonstrate the effect of the second embodiment well, it is preferable that the lower limit value of the conditional expression (7) is 1.6. It is even better that the lower limit value of the conditional expression (7) is 1.8.

In the zoom lens ZL according to the second embodiment, it is preferable that the first lens component of the fourth lens group G4 is constituted by a positive lens, the second lens component of the fourth lens group G4 is constituted by a negative lens, and at least one of the positive lens and the negative lens has an aspherical surface. This makes it possible to correct abaxial astigmatism, coma aberration and curvature of field ideally.

In the zoom lens ZL according to the second embodiment, it is preferable that the above mentioned conditional expression (8) is satisfied. Thereby a similar affect as the first embodiment can be implemented. To demonstrate the effect of the second embodiment well, it is preferable that the upper limit value of the conditional expression (8) is 0.18. It is even better that the upper limit value of the conditional expression (8) is 0.16. To demonstrate the effect of the second embodiment well, it is preferable that the lower limit value of the conditional expression (8) is 0.12. It is even better that the lower limit value of conditional expression (8) is 0.14.

According to the second embodiment, a zoom lens ZL that has compactness and excellent optical performance, even if the zoom ratio is high, and an imaging apparatus (digital still camera CAM) having this zoom lens ZL, can be implemented.

It is preferable that an aperture stop S is disposed near the object side of the first positive lens of the third lens group G3, and the third lens group G3 and the aperture stop S move together along the optical axis upon zooming from the wide-angle end state to the telephoto end state.

It is preferable that at least a part of the third lens group G3 can move so as to have a component in a vertical direction to the optical axis.

It is preferable that the fourth lens group G4 moves along the optical axis upon focusing from an object at infinity to an object at a finite distance.

Now a method for manufacturing the zoom lens ZL according to the second embodiment will be described with reference to FIG. 11, just like the first embodiment. First the first lens group G1, the second lens group G2, the third lens group G3 and the fourth lens group G4 are assembled, in order from the object, in a cylindrical lens barrel (step ST10). Each lens is driveably constituted so that upon zooming from the wide-angle end state to the telephoto end state, the distance between the first lens group G1 and the second lens group G2 changes, the distance between the second lens group G2 and the third lens group G3 changes, and the fourth lens group G4 moves toward the object first, then moves toward an image (step ST20).

In step ST10 in which the lenses are assembled, each lens is disposed so that the first lens group G1 has positive refractive power, the second lens group G2 has negative refractive power, the third lens group G3 has positive refractive power, and the fourth lens group G4 has positive refractive power. For the third lens group G3, the first positive lens, the negative lens and the second positive lens are disposed in order from the object. For the fourth lens group G4, the first lens component and the second lens component are disposed, and the second lens component is disposed on the image side of the first lens component via an air space. Each lens is disposed so as to satisfy the above mentioned conditional expression (9) among others. According to this manufacturing method, the mechanical mechanism can be simplified, and the zoom lens ZL that has compactness and excellent optical performance, even if the zoom ratio is high, can be implemented.

EXAMPLES

Example 1

Each example of the first and second embodiments of the present invention will now be described with reference to the drawings. Example 1 will be described first with reference to FIG. 1, FIG. 2 and Table 1. FIG. 1 shows a cross-section and zoom locus of a zoom lens ZL (ZL1) according to Example 1. The zoom lens ZL1 according to Example 1 comprises, in order from an object, a first lens group G1 having positive refractive power, a second lens group G2 having negative refractive power, an aperture stop S, a third lens group G3 having positive refractive power, and a fourth lens group G4 having positive refractive power.

The first lens group G1 includes, in order from an object, a negative lens L11 in a meniscus form having a convex surface facing the object, a first positive lens L12 in a biconvex form, and a second positive lens L13 in a meniscus form having a convex surface facing the object, and the negative lens L11 and the first positive lens L12 are cemented. The second lens group G2 includes, in order from the object, a first negative lens L21 in a biconcave form, a second negative lens L22 in a biconcave form, and a positive lens L23 in a meniscus form having a convex surface facing the object. The third lens group G3 includes, in order from the object, a first positive lens L31 in a meniscus form having a convex surface facing the object, a negative lens L32 in a meniscus form having a convex surface facing the object, and a second positive lens L33 in a biconvex form. The object side lens surface of the first positive lens L31 of the third lens group G3 is aspherical.

The fourth lens group G4 includes, in order from the object, a positive lens L41 in a biconvex form, and a negative lens L42 in a meniscus form having a convex surface facing an image plane I. The negative lens L42 of the fourth lens group G4 is disposed on the image plane I side of the positive lens L41 via an air space. The object side lens surface of the positive lens L41 of the fourth lens group G4 is aspherical. Focusing from an object at infinity to an object at a finite distance is performed by moving the fourth lens group G4 along the optical axis.

The aperture stop S is disposed near the object side of the first positive lens L31 closest to the object in the third lens group G3, and moves together with the third lens group G3 upon zooming from the wide-angle end state to the telephoto end state. A filter group FL constituted by a low-pass filter, an infrared cut-off filter or the like, is disposed between the fourth lens group G4 and the image plane I.

In the zoom lens ZL1 having this configuration, upon zooming from the wide-angle end state (W) to the telephoto end state (T), the first lens group G1 to the fourth lens group G4 move along the optical axis respectively, so that a distance between the first lens group G1 and the second lens group G2 increases, a distance between the second lens group G2 and the third lens group G3 decreases, and a distance between the third lens group G3 and the fourth lens group G4 changes. The fourth lens group G4 at this time moves toward the object first, then moves toward the image plane I.

Table 1 to Table 4 shown below list each data on the zoom lenses according to Example 1 to Example 4. In [General Data] in each table, values on the focal length f, F number FNO, half angle of view ω(maximum incident angle: unit is "°"), maximum image height Y, back focus BF (converted into air), and total lens length TL (converted into air) are shown respectively. In [Lens Data], the first column N is the number of the lens surface counted from the object side, the second column R is the radius of curvature of the lens surface, and the third column D is a distance to the next lens surface, the fourth column nd is a refractive index at d-line (wavelength λ=587.6 nm), and the fifth column νd is an Abbe number at d-line (wavelength λ=587.6 nm). "*" attached to the right of the first column indicates that this lens surface is aspherical. The radius of curvature "∞" indicates a plane, and the refractive index of the air nd=1.000000 is omitted.

In [Aspherical Data], an aspherical coefficient is given by the following expression (E), where X(y) denotes a distance along the optical axis from the tangential plane at the vertex of each aspherical surface to each aspherical surface at height y, R denotes a radius of curvature of the reference spherical surface (paraxial radius of curvature), κ denotes a conical coefficient, and An is an aspherical coefficient in degree n (n=4, 6, 8, 10). In each example, the aspherical coefficient of degree 2, that is A2=0, is omitted in the tables. In [Aspherical Data], "E-n" indicates "×10$^{-n}$".

$$X(y)=(y^2/R)/\{1+(1-\kappa\times y^2/R^2)^{1/2}\}+A4\times y^4+A6\times y^6+A8\times y^8+A10\times y^{10} \quad (E)$$

In [Variable Distance Data], each value of the focal length f of the zoom lens from the wide-angle end state to the telephoto end state, and variable distances are shown. In [Zoom Lens Group Data], a value of the focal length of each lens group is shown respectively. In [Conditional Expression Correspondence Value], a correspondence value of each conditional expression is shown. In [Conditional Expression Correspondence Value], f3a denotes a focal length of the first positive lens L31 of the third lens group G3, f3b denotes a focal length of the negative lens L32 of the third lens group G3, and f3c denotes a focal length of the second positive lens L33 of the third lens group G3. In all the data values, "mm" is normally used as the unit of focal length f, radius of curvature R, surface distance D and other lengths. However unit is not limited to "mm", since an equivalent optical performance is obtained even if an optical system is proportionally expanded or proportionally reduced. For the data values of the later mentioned Example 2 to Example 4, symbols the same as this example are used.

Table 1 shows each data of Example 1. Each radius of curvature R of the surfaces 1 to 26 in Table 1 correspond to the symbols R1 to R26 assigned to the surfaces 1 to 26 in FIG. 1. In Example 1, the lens surfaces of Surface 13 and Surface 19 are formed to be aspherical respectively.

TABLE 1

[General Data]
Zoom ratio = 13.28

| Wide-angle end state | Intermediate focal length state | Telephoto end state |
|---|---|---|
| f = 4.63 | 25.00 | 61.50 |
| FNO = 3.47 | 5.24 | 6.10 |
| ω = 42.30 | 9.20 | 3.69 |
| Y = 3.50 | 4.05 | 4.05 |
| BF = 0.400 | 0.400 | 0.400 |
| TL = 43.225 | 56.760 | 65.199 |

[Lens Data]

| N | R | D | nd | νd |
|---|---|---|---|---|
| 1 | 53.6253 | 0.8000 | 1.922860 | 20.88 |
| 2 | 32.4915 | 2.6000 | 1.497820 | 82.57 |
| 3 | −118.0019 | 0.1000 | | |
| 4 | 22.2713 | 2.0000 | 1.729160 | 54.61 |
| 5 | 56.4595 | (D5) | | |
| 6 | −162.7110 | 0.7000 | 1.883000 | 40.66 |
| 7 | 5.5000 | 2.1000 | | |
| 8 | −22.5108 | 0.6000 | 1.883000 | 40.66 |
| 9 | 13.3627 | 0.4000 | | |
| 10 | 10.6391 | 1.3500 | 1.945950 | 17.98 |
| 11 | 248.5232 | (D11) | | |
| 12 | ∞ | 0.4500 | (Aperture stop S) | |
| 13* | 4.8525 | 2.2000 | 1.677900 | 54.89 |
| 14 | 248.1849 | 0.6000 | | |
| 15 | 8.8654 | 1.7000 | 2.000690 | 25.46 |
| 16 | 4.1905 | 0.3500 | | |
| 17 | 10.8000 | 1.5000 | 1.497820 | 82.57 |
| 18 | −27.0719 | (D18) | | |
| 19* | 17.0612 | 1.8000 | 1.773770 | 47.25 |
| 20 | −29.2047 | 0.1500 | | |
| 21 | −23.0248 | 0.6000 | 1.846660 | 23.80 |
| 22 | −45.6869 | (D22) | | |
| 23 | ∞ | 0.2100 | 1.516330 | 64.14 |
| 24 | ∞ | 0.3900 | | |
| 25 | ∞ | 0.5000 | 1.516330 | 64.14 |
| 26 | ∞ | | | |

[Aspherical Data]

Surface 13

κ = 0.5402, A4 = −2.54311E−04, A6 = −5.02266E−06,
A8 = 0.00000E+00, A10 = 0.00000E+00

Surface 19

κ = 1.0000, A4 = 3.07646E−05, A6 = 2.10881E−06,
A8 = −5.92646E−08, A10 = 1.33106E−09

[Variable Distance Data]

| | Wide-angle end state | Intermediate focal length state | Telephoto end state |
|---|---|---|---|
| f = | 4.6308 | 24.9998 | 61.4985 |
| D5 = | 0.9000 | 15.0856 | 22.0555 |
| D11 = | 12.7750 | 2.0997 | 0.7500 |
| D18 = | 5.8504 | 7.2585 | 20.0945 |
| D22 = | 3.9000 | 12.5160 | 2.5000 |

[Zoom Lens Group Data]

| Group number | First surface of group | Group focal length |
|---|---|---|
| G1 | 1 | 35.0789 |
| G2 | 6 | −5.4927 |
| G3 | 13 | 10.2852 |
| G4 | 19 | 28.7822 |

[Conditional Expression Correspondence Value]

f3a = 7.2827
f3b = −8.3901
f3c = 15.7148
Conditional expression (1) f3/fw = 2.2210
Conditional expression (2) (−f3b)/f3 = 0.8158
Conditional expression (3) f3/f4 = 0.3573
Conditional expression (4) (−f2)/fw = 1.1861
Conditional expression (5) TLt/ft = 1.0602
Conditional expression (6) D1/fw = 1.1877
Conditional expression (7) f3c/f3a = 2.1578
Conditional expression (8) (−f2)/f1 = 0.1566
Conditional expression (9) (R42a + R41b)/(R42a − R41b) = −8.4515

As a result, this example satisfies all conditional expressions (1) to (9).

Figure 2A:
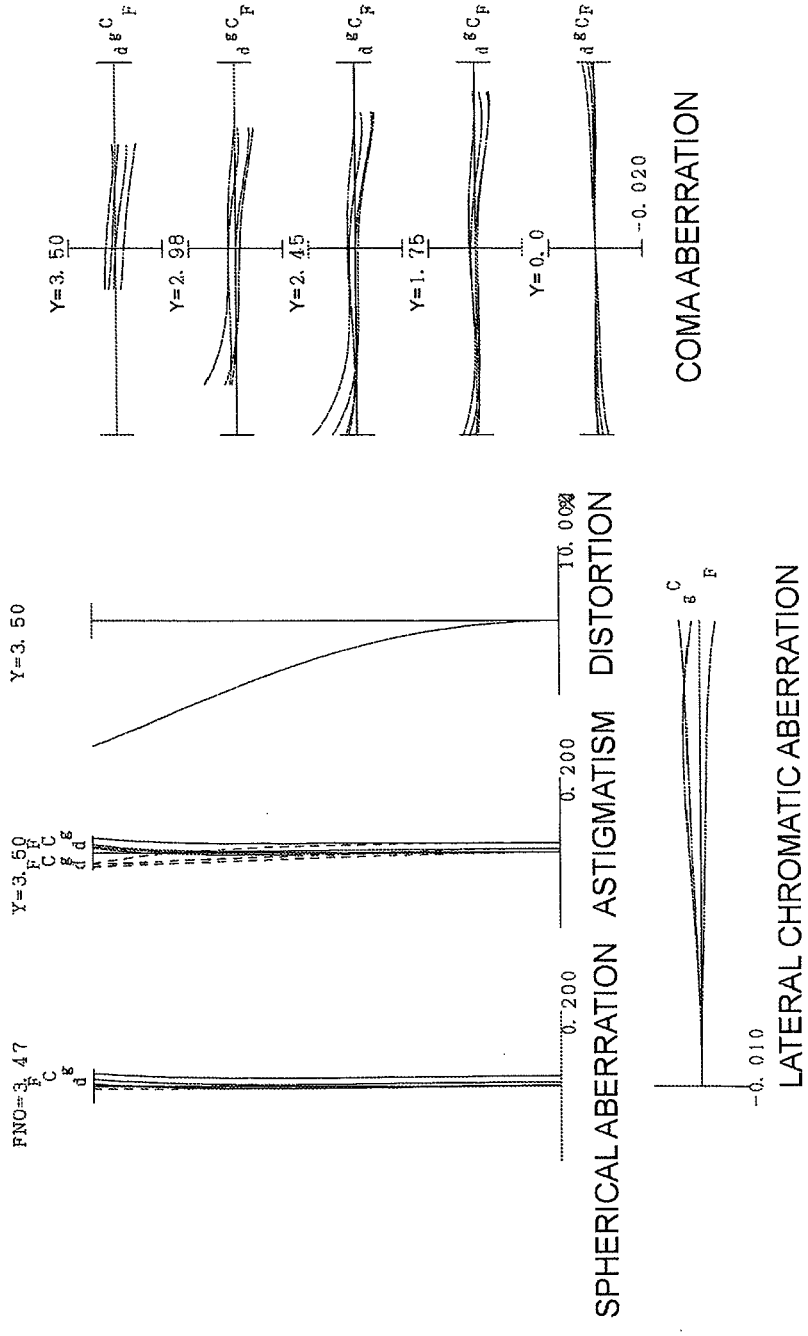
FIG. 2A are graphs showing various aberrations of the zoom lens according to Example 1 upon focusing on infinity in the wide-angle end state, FIG. 2B are graphs showing various aberrations of the zoom lens upon focusing on infinity in the intermediate focal length state, and FIG. 2C are graphs showing various aberrations of the zoom lens upon focusing on infinity in the telephoto end state.
Figure 2B:
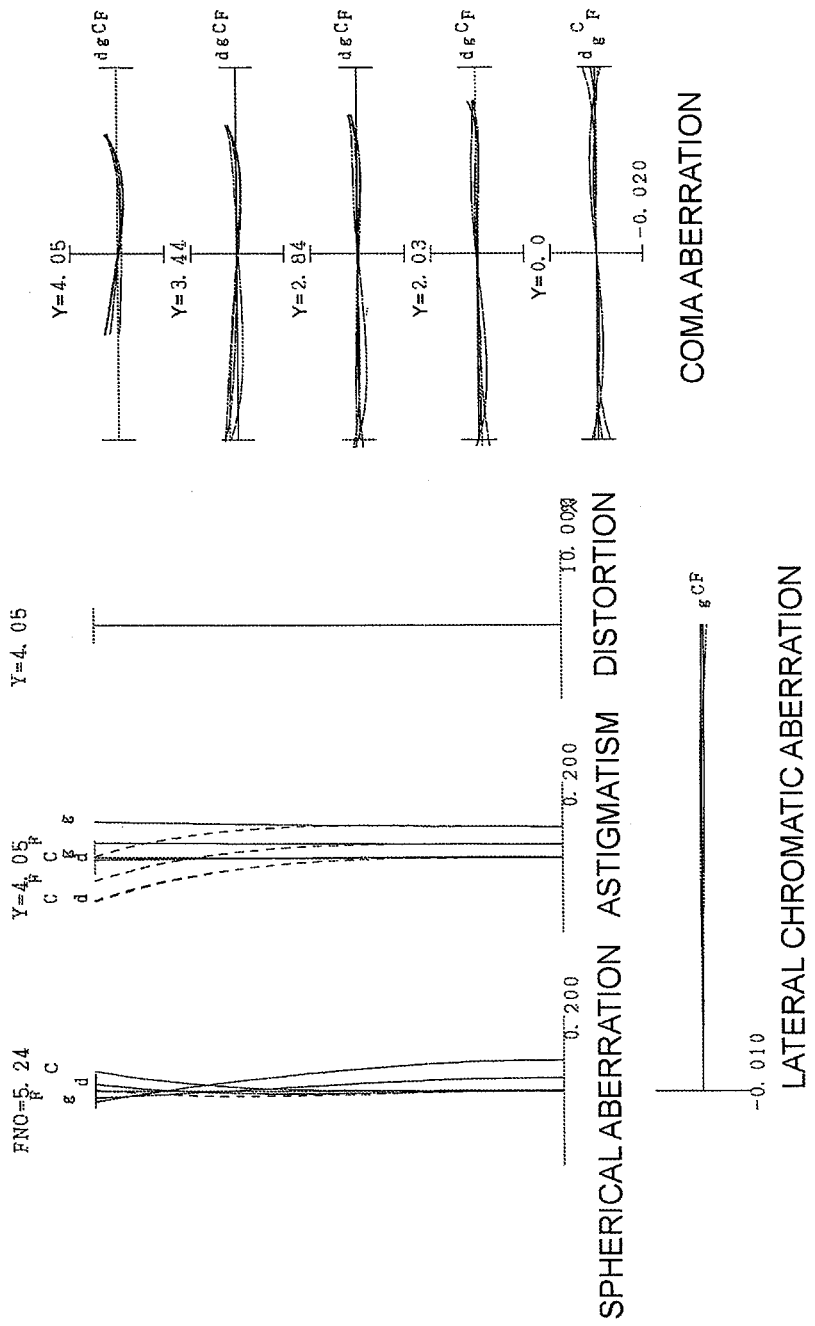

FIG. 2A to FIG. 2C are graphs showing various aberrations of the zoom lens ZL according to Example 1. FIG. 2A are graphs showing various aberrations of the zoom lens upon focusing on infinity in the wide-angle end state (f=4.63 mm), FIG. 2B are graphs showing various aberrations of the zoom lens upon focusing on infinity in the intermediate focal length state (f=25.00 mm), and FIG. 2C are graphs showing various aberrations of the zoom lens upon focusing on infinity in the telephoto end state (f=61.50 mm). In each graph shown aberrations, FNO is an F number, and Y is an image height. In each graph showing aberrations, d indicates various aberrations at d-line (λ=587.6 nm), g indicates various aberrations at g-line (λ=435.8 nm), C indicates various aberrations at C-line (λ=656.3 nm), and F indicates various aberrations at F-line (λ=486.1 nm). In graphs showing astigmatism, the solid line indicates the sagittal image surface, and the broken line indicates the meridional image surface. The description on the graphs showing aberrations is the same as for other examples.

As each graph showing aberrations clarifies, the zoom lens according to Example 1 has an excellent optical performance, where various aberrations are ideally corrected in each focal length state from the wide-angle end state to the telephoto end state. As a result, an excellent optical performance can be guaranteed for the digital still camera CAM as well, by installing the zoom lens ZL1 of Example 1.

Example 2

Example 2 will be described with reference to FIG. 3, FIG. 4 and Table 2. FIG. 3 shows a cross-section and zoom locus of the zoom lens ZL (ZL2) according to Example 2. The zoom lens ZL2 of Example 2 has a same configuration as the zoom lens ZL1 of Example 1, except for a part of the shapes of the second lens group G2 to fourth lens group G4, therefore each component the same as Example 1 is denoted with the same reference symbol, for which detailed description is omitted.

The second lens group G2 of Example 2 includes, in order from the object, a first negative lens L21 in a biconcave form, a second negative lens L22 in a biconcave form, and a positive lens L23 in a biconvex form. The third lens group G3 includes, in order from the object, a first positive lens L31 in a biconvex form, a negative lens L32 in a meniscus form of which convex surface faces the object, and a second positive lens L33 in a biconvex form. The object side lens surface of the first positive lens L31 of the third lens group G3 is aspherical. The fourth lens group G4 includes, in order from the object, a positive lens L41 in a biconvex form and a negative lens L42 in a biconcave form. The negative lens L42 of the fourth lens group G4 is disposed on the image plane I side of the positive lens L41 via an air space. The object side lens surface of the positive lens L41 of the fourth lens group G4 is aspherical.

Table 2 shows each data of Example 2. Each radius of curvature R of the surfaces 1 to 26 in Table 2 correspond to the symbols R1 to R26 assigned to the surfaces 1 to 26 in FIG. 3. In Example 2, the lens surfaces of Surface 13 and Surface 19 are formed to be aspherical respectively.

TABLE 2

[General Data]
Zoom ratio = 13.28

| | Wide-angle end state | Intermediate focal length state | Telephoto end state |
|---|---|---|---|
| f = | 4.63 | 25.00 | 61.50 |
| FNO = | 3.47 | 5.24 | 6.10 |
| ω = | 42.30 | 9.20 | 3.69 |
| Y = | 3.50 | 4.05 | 4.05 |
| BF = | 0.400 | 0.400 | 0.400 |
| TL = | 43.300 | 55.141 | 65.199 |

TABLE 2-continued

[Lens Data]

| N | R | D | nd | νd |
|---|---|---|---|---|
| 1 | 56.6215 | 1.0246 | 1.922860 | 20.88 |
| 2 | 33.4397 | 1.7903 | 1.497820 | 82.57 |
| 3 | −103.5169 | 0.1000 | | |
| 4 | 21.0388 | 1.9979 | 1.729160 | 54.61 |
| 5 | 48.7444 | (D5) | | |
| 6 | −70.7880 | 0.7186 | 1.883000 | 40.66 |
| 7 | 5.6866 | 1.9000 | | |
| 8 | −19.9020 | 0.6000 | 1.883000 | 40.66 |
| 9 | 15.1586 | 0.4000 | | |
| 10 | 11.4098 | 1.3583 | 1.945950 | 17.98 |
| 11 | −490.2556 | (D11) | | |
| 12 | ∞ | 0.4500 | (Aperture stop S) | |
| 13* | 5.0795 | 1.5309 | 1.677900 | 54.89 |
| 14 | −204.9622 | 0.7748 | | |
| 15 | 9.6996 | 0.6000 | 2.000690 | 25.46 |
| 16 | 4.3732 | 0.4373 | | |
| 17 | 10.7905 | 1.8182 | 1.497820 | 82.57 |
| 18 | −28.9052 | (D18) | | |
| 19* | 16.9034 | 1.7715 | 1.773770 | 47.25 |
| 20 | −32.1228 | 0.2518 | | |
| 21 | −26.8909 | 0.6000 | 1.846660 | 23.80 |
| 22 | 182.5440 | (D22) | | |
| 23 | ∞ | 0.2100 | 1.516330 | 64.14 |
| 24 | ∞ | 0.3900 | | |
| 25 | ∞ | 0.5000 | 1.516330 | 64.14 |
| 26 | ∞ | | | |

[Aspherical Data]

Surface 13

κ = 0.6210, A4 = −3.52091E−04, A6 = −6.99485E−06,
A8 = 0.00000E+00, A10 = 0.00000E+00

Surface 19

κ = 1.0000, A4 = 2.24029E−05, A6 = 2.12428E−06,
A8 = −7.86881E−08, A10 = 1.91369E−09

[Variable Distance Data]

| Wide-angle end state | Intermediate focal length state | Telephoto end state |
|---|---|---|
| f = 4.6301 | 24.9998 | 61.4990 |
| D5 = 0.9356 | 15.1545 | 21.8060 |
| D11 = 13.2196 | 2.0216 | 0.7500 |
| D18 = 5.8446 | 5.4441 | 20.5198 |
| D22 = 3.6761 | 12.8974 | 2.5000 |

[Zoom Lens Group Data]

| Group number | First surface of group | Group focal length |
|---|---|---|
| G1 | 1 | 13.2196 |
| G2 | 6 | −5.5740 |
| G3 | 13 | 10.4531 |
| G4 | 19 | 28.5913 |

[Conditional Expression Correspondence Value]

f3a = 7.3333
f3b = −8.4334
f3c = 16.0275
Conditional expression (1) f3/fw = 2.2576
Conditional expression (2) (−f3b)/f3 = 0.8068
Conditional expression (3) f3/f4 = 0.3656
Conditional expression (4) (−f2)/fw = 1.2039
Conditional expression (5) TLt/ft = 1.0602
Conditional expression (6) D1/fw = 1.0611
Conditional expression (7) f3c/f3a = 2.1856
Conditional expression (8) (−f2)/f1 = 0.1594
Conditional expression (9) (R42a + R41b)/(R42a − R41b) = −11.2794

As a result, this example satisfies all conditional expressions (1) to (9).

Figure 4A:
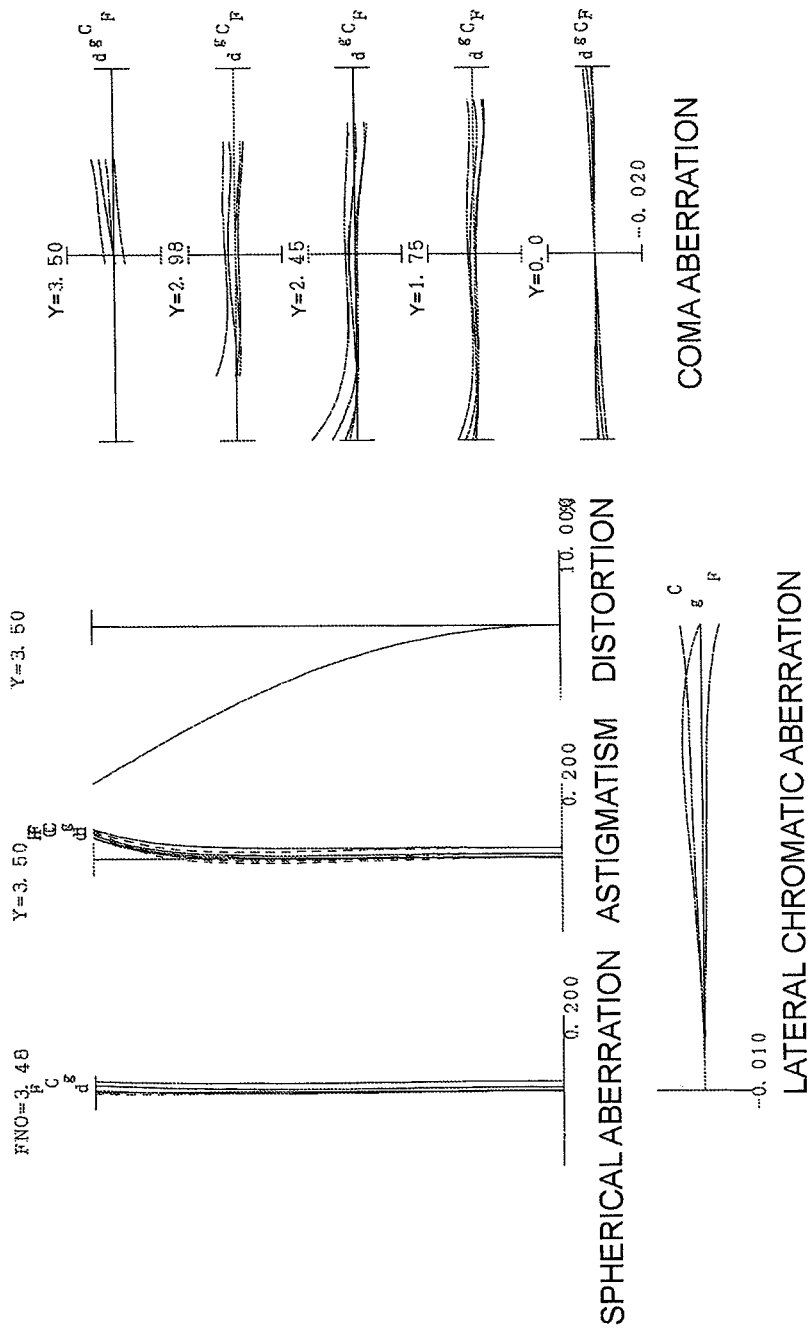
FIG. 4A are graphs showing various aberrations of the zoom lens according to Example 2 upon focusing on infinity in the wide-angle end state, FIG. 4B are graphs showing various aberrations of the zoom lens upon focusing on infinity in the intermediate focal length state, and FIG. 4C are graphs showing various aberrations of the zoom lens upon focusing on infinity in the telephoto end state.
Figure 4B:
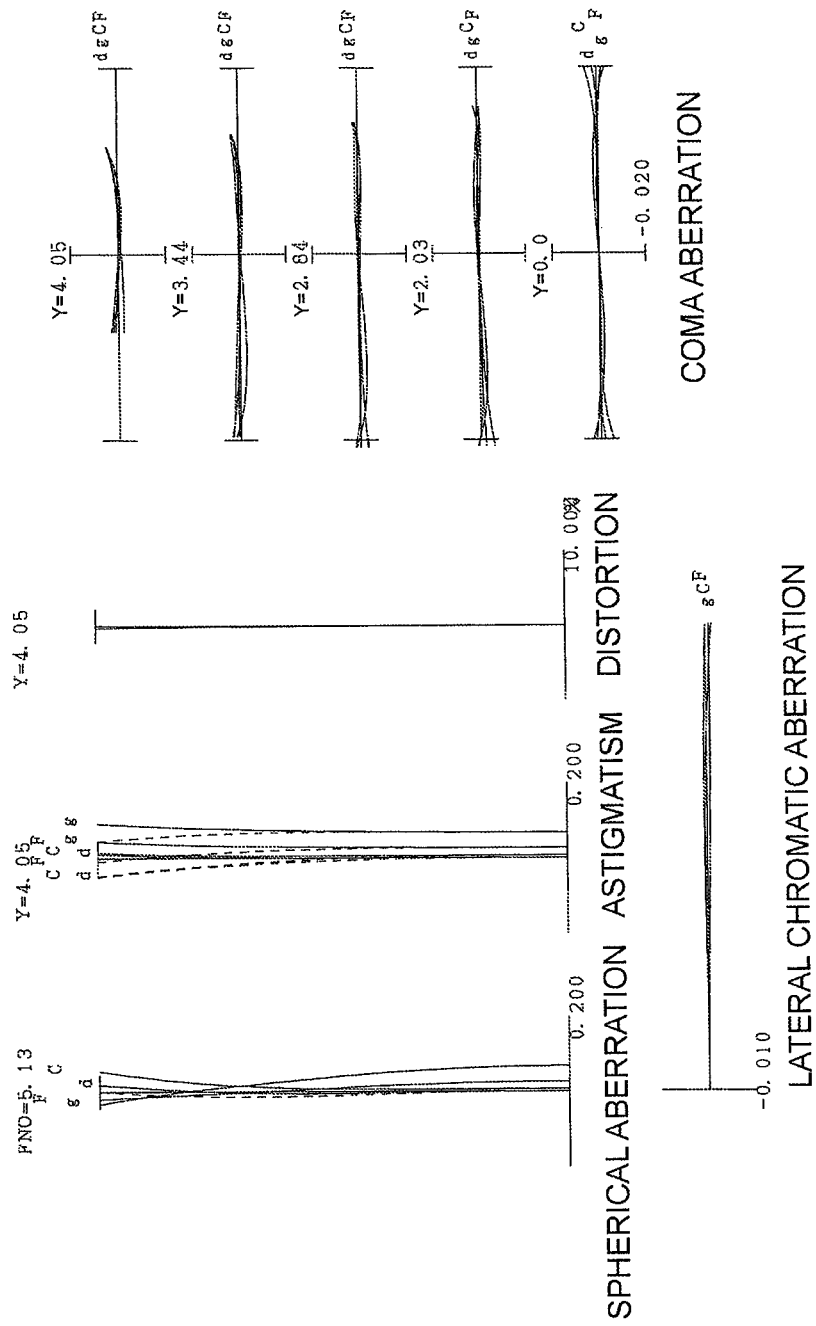
Figure 4C:
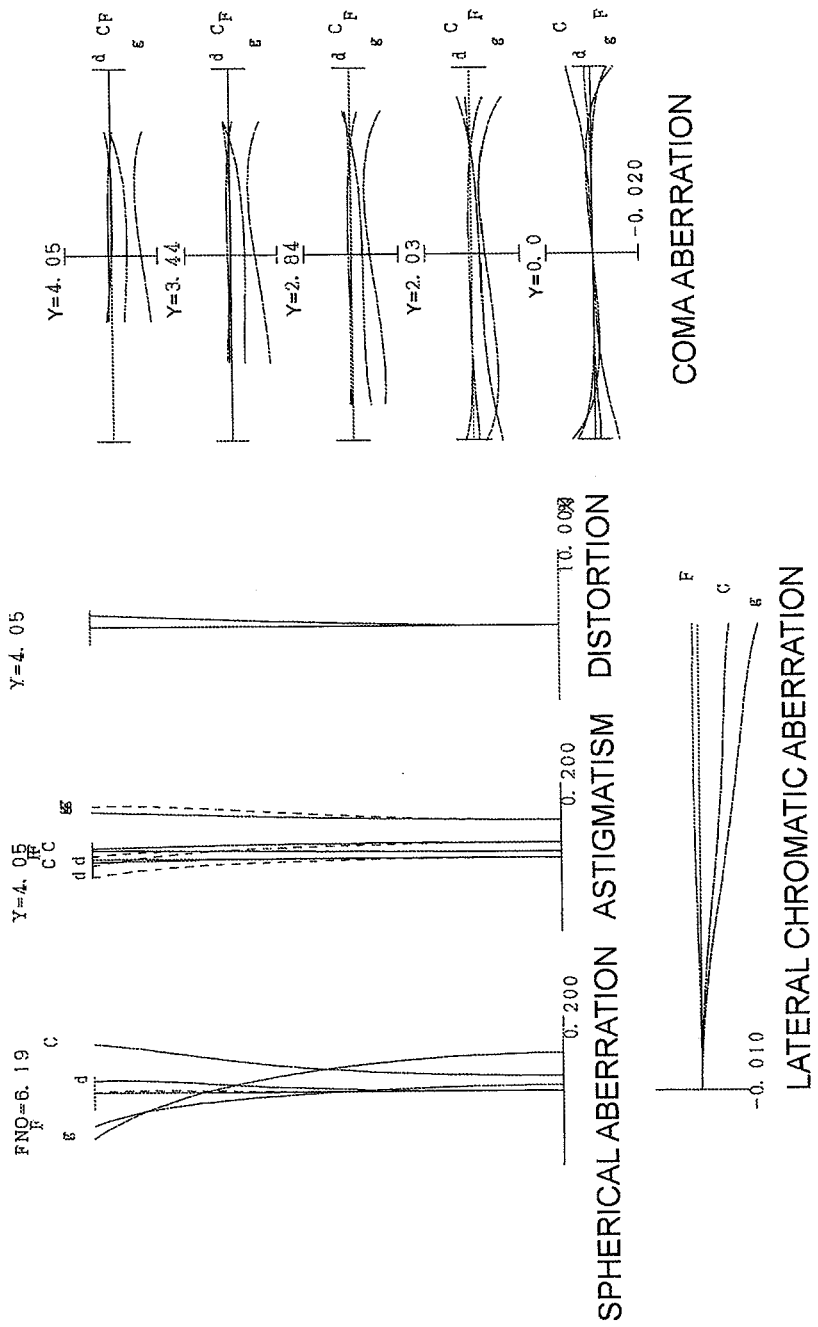

FIG. 4A to FIG. 4C are graphs showing various aberrations of the zoom lens ZL according to Example 2. FIG. 4A are graphs showing various aberrations of the zoom lens upon focusing on infinity in the wide-angle end state (f=4.63 mm), FIG. 4B are graphs showing various aberrations of the zoom lens upon focusing on infinity in the intermediate focal length state (f=25.00 mm), and FIG. 4C are graphs showing various aberrations of the zoom lens upon focusing on infinity in the telephoto end state (f=61.50 mm). As each graph showing aberrations clarifies, the zoom lens according to Example 2 has an excellent optical performance, where various aberrations are ideally corrected in each focal length state from the wide-angle end state to the telephoto end state. As a result, an excellent optical performance can be guaranteed for the digital still camera CAM as well, by installing the zoom lens ZL2 of Example 2.

Example 3

Figure 5:
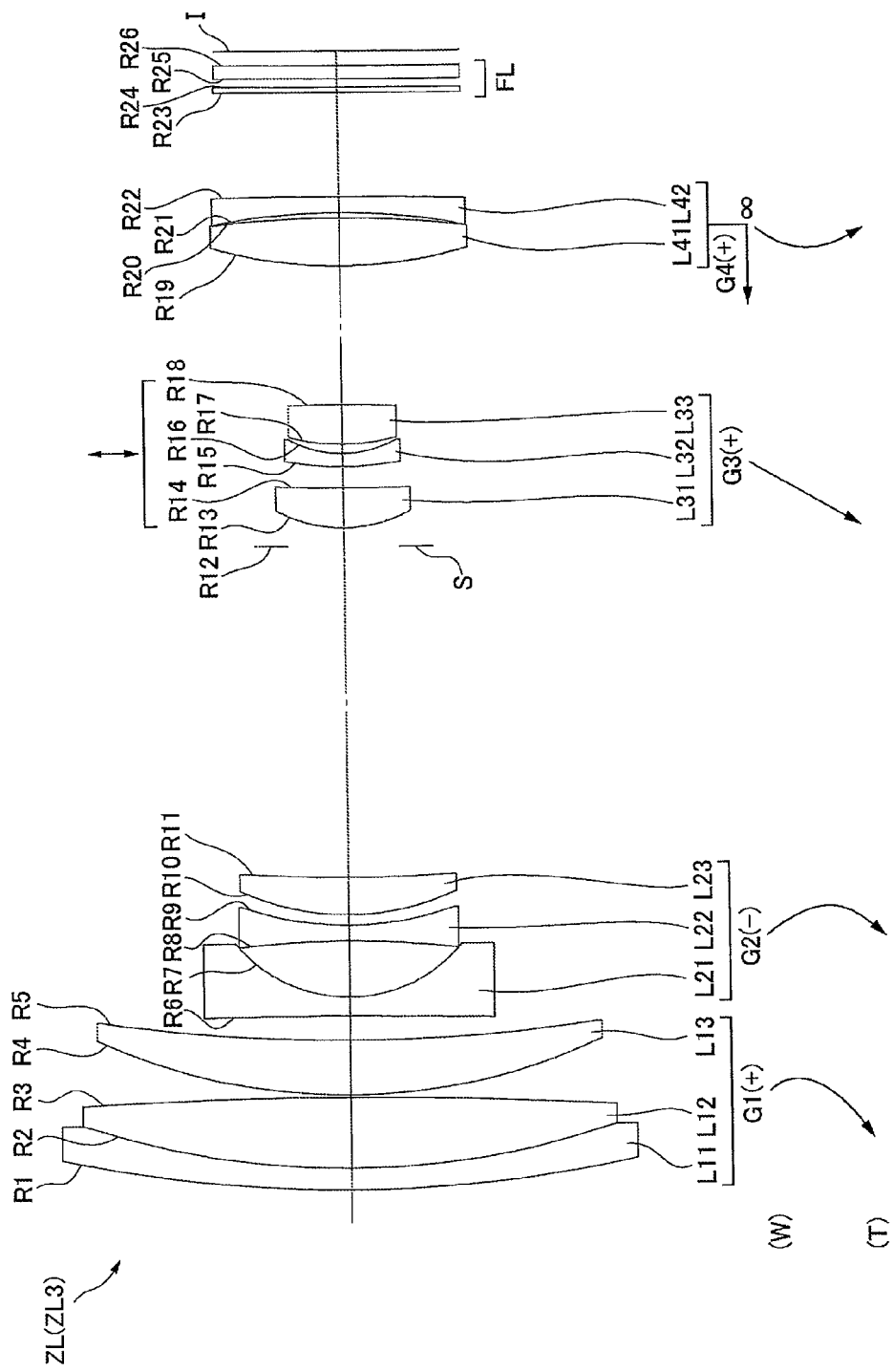
FIG. 5 shows a cross-section and a zoom locus of a zoom lens according to Example 3.

Example 3 will be described with reference to FIG. 5, FIG. 6 and Table 3. FIG. 5 shows a cross-section and zoom locus of the zoom lens ZL (ZL3) according to Example 3. The zoom lens ZL3 of Example 3 has a same configuration as the zoom lens ZL1 of Example 1, therefore each component the same as Example 1 is denoted with the same reference symbol, for which detailed description is omitted.

Table 3 shows each data of Example 3. Each radius of curvature R of the surfaces 1 to 26 in Table 3 correspond to the symbols R1 to R26 assigned to the surfaces 1 to 26 in FIG. 5. In Example 3, the lens surfaces of Surface 13 and Surface 19 are formed to be aspherical respectively.

TABLE 3

[General Data]
Zoom ratio = 13.18

| Wide-angle end state | Intermediate focal length state | Telephoto end state |
|---|---|---|
| f = 4.64 | 26.42 | 61.17 |
| FNO = 3.44 | 5.09 | 6.13 |
| ω = 42.16 | 8.69 | 3.71 |
| Y = 3.50 | 4.05 | 4.05 |
| BF = 0.550 | 0.546 | 0.532 |
| TL = 42.760 | 56.117 | 64.812 |

[Lens Data]

| N | R | D | nd | vd |
|---|---|---|---|---|
| 1 | 51.3271 | 0.8000 | 1.922860 | 20.88 |
| 2 | 31.2400 | 2.6500 | 1.497820 | 82.57 |
| 3 | −178.5385 | 0.1000 | | |
| 4 | 22.5055 | 2.0500 | 1.729160 | 54.61 |
| 5 | 62.7756 | (D5) | | |
| 6 | −313.8859 | 0.7000 | 1.883000 | 40.66 |
| 7 | 5.3812 | 2.1000 | | |
| 8 | −35.2565 | 0.6000 | 1.883000 | 40.66 |
| 9 | 11.7404 | 0.4000 | | |
| 10 | 9.5680 | 1.4000 | 1.945950 | 17.98 |
| 11 | 61.9775 | (D11) | | |
| 12 | ∞ | 0.7000 | (Aperture stop S) | |
| 13* | 4.9052 | 1.5000 | 1.773770 | 47.25 |
| 14 | 79.3207 | 0.8000 | | |
| 15 | 10.9134 | 0.5000 | 2.000690 | 25.46 |
| 16 | 4.0389 | 0.3500 | | |
| 17 | 7.9088 | 1.5000 | 1.497820 | 82.57 |
| 18 | −27.7252 | (D18) | | |
| 19* | 17.9009 | 1.8000 | 1.773770 | 47.25 |
| 20 | −37.8473 | 0.2000 | | |
| 21 | −23.5026 | 0.6000 | 1.846660 | 23.80 |
| 22 | −191.9692 | (D22) | | |
| 23 | ∞ | 0.2100 | 1.516330 | 64.14 |
| 24 | ∞ | 0.3100 | | |
| 25 | ∞ | 0.5000 | 1.516330 | 64.14 |
| 26 | ∞ | | | |

[Aspherical Data]

Surface 13

κ = 0.5664, A4 = −1.72762E−04, A6 = −4.46945E−06,
A8 = 0.00000E+00, A10 = 0.00000E+00

Surface 19

κ = 1.0000, A4 = 4.70223E−05, A6 = 5.74660E−07,
A8 = 2.14665E−09, A10 = 8.73283E−10

[Variable Distance Data]

| Wide-angle end state | Intermediate focal length state | Telephoto end state |
|---|---|---|
| f = 4.6443 | 26.4158 | 61.1730 |
| D5 = 0.9000 | 15.9330 | 22.0994 |
| D11 = 12.4583 | 1.7867 | 0.4999 |
| D18 = 5.1924 | 5.5906 | 19.6169 |
| D22 = 3.8891 | 12.4912 | 2.2935 |

[Zoom Lens Group Data]

| Group number | First surface of group | Group focal length |
|---|---|---|
| G1 | 1 | 35.4501 |
| G2 | 6 | −5.5409 |
| G3 | 13 | 10.0697 |
| G4 | 19 | 30.3936 |

[Conditional Expression Correspondence Value]

f3a = 6.6983
f3b = −6.6494
f3c = 12.5362
Conditional expression (1) f3/fw = 2.1682
Conditional expression (2) (−f3b)/f3 = 0.6603
Conditional expression (3) f3/f4 = 0.3313
Conditional expression (4) (−f2)/fw = 1.1931
Conditional expression (5) TLt/ft = 1.0595
Conditional expression (6) D1/fw = 1.2058
Conditional expression (7) f3c/f3a = 1.8715
Conditional expression (8) (−f2)/f1 = 0.1563
Conditional expression (9) (R42a + R41b)/(R42a − RA1b) = −4.2769

As a result, this example satisfies all conditional expressions (1) to (9).

Figure 6A:
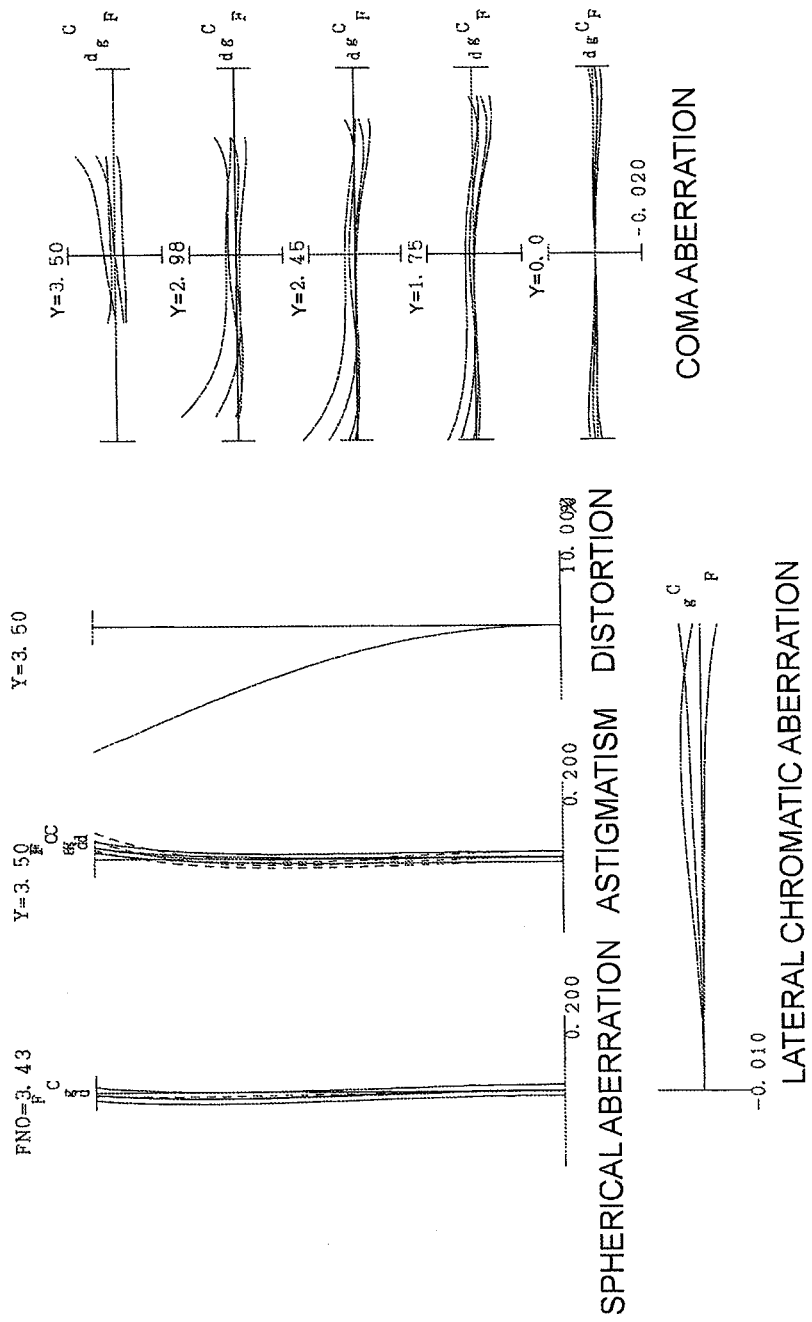
FIG. 6A are graphs showing various aberrations of the zoom lens according to Example 3 upon focusing on infinity in the wide-angle end state, FIG. 6B are graphs showing various aberrations of the zoom lens upon focusing on infinity in the intermediate focal length state, and FIG. 6C are graphs showing various aberrations of the zoom lens upon focusing on infinity in the telephoto end state.

FIG. 6A to FIG. 6C are graphs showing various aberrations of the zoom lens ZL according to Example 3. FIG. 6A are graphs showing various aberrations of the zoom lens upon focusing on infinity in the wide-angle end state (f=4.64 mm), FIG. 6B are graphs showing various aberrations of the zoom lens upon focusing on infinity in the intermediate focal length state (f=26.41 mm), and FIG. 6C are graphs showing various aberrations of the zoom lens upon focusing on infinity in the telephoto end state (f=61.17 mm). As each graph showing aberrations clarifies, the zoom lens according to Example 3 has an excellent optical performance, where various aberrations are ideally corrected in each focal length state from the wide-angle end state to the telephoto end state. As a result, an excellent optical performance can be guaranteed for the digital still camera CAM as well, by installing the zoom lens ZL3 of Example 3.

Example 4

Figure 7:
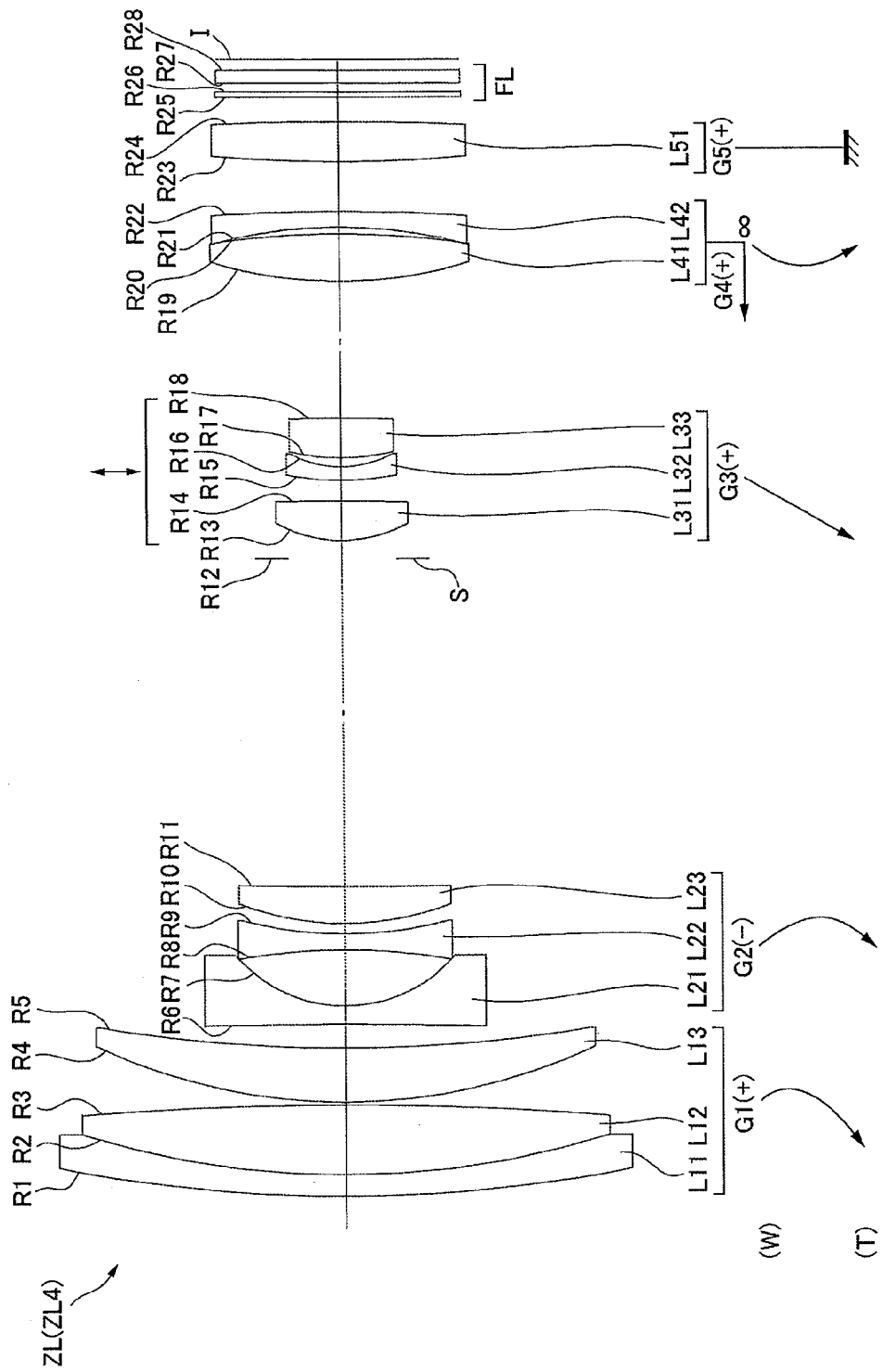
FIG. 7 shows a cross-section and a zoom locus of a zoom lens according to Example 4.

Example 4 will be described with reference to FIG. 7, FIG. 8 and Table 4. FIG. 7 shows a cross-section and zoom locus of the zoom lens ZL (ZL4) according to Example 4. The zoom lens ZL4 of Example 4 has a same configuration as the zoom lens ZL1 of Example 1, except for a part of the shapes of the third lens group G3 and a fifth lens group G5 which is included. Therefore each component the same as Example 1 is denoted with the same reference symbol, for which detailed description is omitted. The zoom lens ZL4 of Example 4 comprises, in order from the object, a first lens group G1 having positive refractive power, a second lens group G2 having negative refractive power, an aperture stop S, a third lens group G3 having positive refractive power, a fourth lens group G4 having positive refractive power, and a fifth lens group G5 having positive refractive power.

The third lens group G3 of Example 4 includes, in order from the object, a first positive lens L31 in a biconvex form, a negative lens L32 in a meniscus form having a convex surface facing the object, and a second positive lens L33 in a biconvex form. The object side lens surface of the first positive lens L31 of the third lens group G3 is aspherical. The fifth lens group G5 includes a positive lens L51 in a biconvex form. A filter group FL, constituted by a low-pass filter, an infrared cut-off filter or the like, is disposed between the fifth lens group G5 and the image plane I.

In the zoom lens ZL4 of Example 4, upon zooming from the wide-angle end state (W) to the telephoto end state (T), the first lens group G1 to the fourth lens group G4 move along the optical axis respectively, so that a distance between the first lens group G1 and the second lens group G2 increases, a distance between the second lens group G2 and the third lens group G3 decreases, and a distance between the third lens group G3 and the fourth lens group G4 changes, but the fifth lens group G5 is fixed. During this time, the fourth lens group G4 moves toward the object first, then moves toward the image plane I.

Table 4 shows each data of Example 4. Each radius of curvature R of the surfaces 1 to 28 in Table 4 correspond to the symbols R1 to R28 assigned to the surfaces 1 to 28 in FIG. 7. In Example 4, the lens surfaces of Surface 13 and Surface 19 are formed to be aspherical respectively.

TABLE 4

[General Data]
Zoom ratio = 13.22

| Wide-angle end state | Intermediate focal length state | Telephoto end state |
| --- | --- | --- |
| f = 4.63 | 26.47 | 61.19 |
| FNO = 3.41 | 5.09 | 6.12 |
| ω = 42.24 | 8.67 | 3.71 |
| Y = 3.50 | 4.05 | 4.05 |
| BF = 0.400 | 0.400 | 0.400 |
| TL = 43.085 | 56.725 | 65.267 |

[Lens Data]

| N | R | D | nd | vd |
| --- | --- | --- | --- | --- |
| 1 | 51.8195 | 0.8000 | 1.922860 | 20.88 |
| 2 | 33.1460 | 2.6500 | 1.497820 | 82.57 |
| 3 | −122.9969 | 0.1000 | | |
| 4 | 22.0228 | 2.0500 | 1.729160 | 54.61 |
| 5 | 56.1881 | (D5) | | |
| 6 | −192.5506 | 0.7000 | 1.883000 | 40.66 |
| 7 | 5.5050 | 2.1000 | | |
| 8 | −23.3257 | 0.6000 | 1.883000 | 40.66 |
| 9 | 14.9697 | 0.4000 | | |
| 10 | 11.0068 | 1.4000 | 1.945950 | 17.98 |
| 11 | 156.1078 | (D11) | | |
| 12 | ∞ | 0.7000 | (Aperture stop S) | |
| 13* | 4.8040 | 1.5000 | 1.773770 | 47.25 |
| 14 | −184.4232 | 0.8000 | | |
| 15 | 11.2518 | 0.5000 | 2.000690 | 25.46 |
| 16 | 3.8933 | 0.3500 | | |
| 17 | 8.6127 | 1.5000 | 1.497820 | 82.57 |
| 18 | −56.4796 | (D18) | | |
| 19* | 18.0841 | 1.8000 | 1.773770 | 47.25 |
| 20 | −31.6581 | 0.2500 | | |
| 21 | −18.4533 | 0.6000 | 1.846660 | 23.80 |
| 22 | −67.8833 | (D22) | | |
| 23 | 55.8891 | 1.5000 | 1.497820 | 82.57 |
| 24 | −188.4870 | 0.9235 | | |
| 25 | ∞ | 0.2100 | 1.516330 | 64.14 |
| 26 | ∞ | 0.3100 | | |
| 27 | ∞ | 0.5000 | 1.516330 | 64.14 |
| 28 | ∞ | | | |

[Aspherical Data]

Surface 13

κ = 0.2554, A4 = 5.02982E−05, A6 = −1.03335E−06,
A8 = 0.00000E+00, A10 = 0.00000E+00

Surface 19

κ = 1.0000, A4 = 7.76527E−05, A6 = −5.02374E−07,
A8 = 9.19007E−08, A10 = −9.37411E−10

[Variable Distance Data]

| Wide-angle end state | Intermediate focal length state | Telephoto end state |
| --- | --- | --- |
| f = 4.6346 | 26.4713 | 61.1932 |
| D5 = 0.9000 | 15.9330 | 22.0994 |
| D11 = 12.4583 | 1.7867 | 0.4999 |
| D18 = 5.1924 | 5.5906 | 19.6169 |
| D22 = 1.8910 | 10.7715 | 0.4073 |

[Zoom Lens Group Data]

| Group number | First surface of group | Group focal length |
| --- | --- | --- |
| G1 | 1 | 35.3921 |
| G2 | 6 | −5.62309 |
| G3 | 13 | 10.0812 |
| G4 | 19 | 28.8447 |
| G5 | 23 | 76.5036 |

[Conditional Expression Correspondence Value]

f3a = 6.0719
f3b = −6.1584
f3c = 15.1275
Conditional expression (1) f3/fw = 2.1752
Conditional expression (2) (−f3b)/f3 = 0.6109
Conditional expression (3) f3/f4 = 0.3495
Conditional expression (4) (−f2)/fw = 1.2133
Conditional expression (5) TLt/ft = 1.0666
Conditional expression (6) D1/fw = 1.2083
Conditional expression (7) f3c/f3a = 2.4914
Conditional expression (8) (−f2)/f1 = 0.1589
Conditional expression (9) (R42a + R41b)/(R42a − R41b) = −3.7949

As a result, this example satisfies all conditional expressions (1) to (9).

Figure 8A:
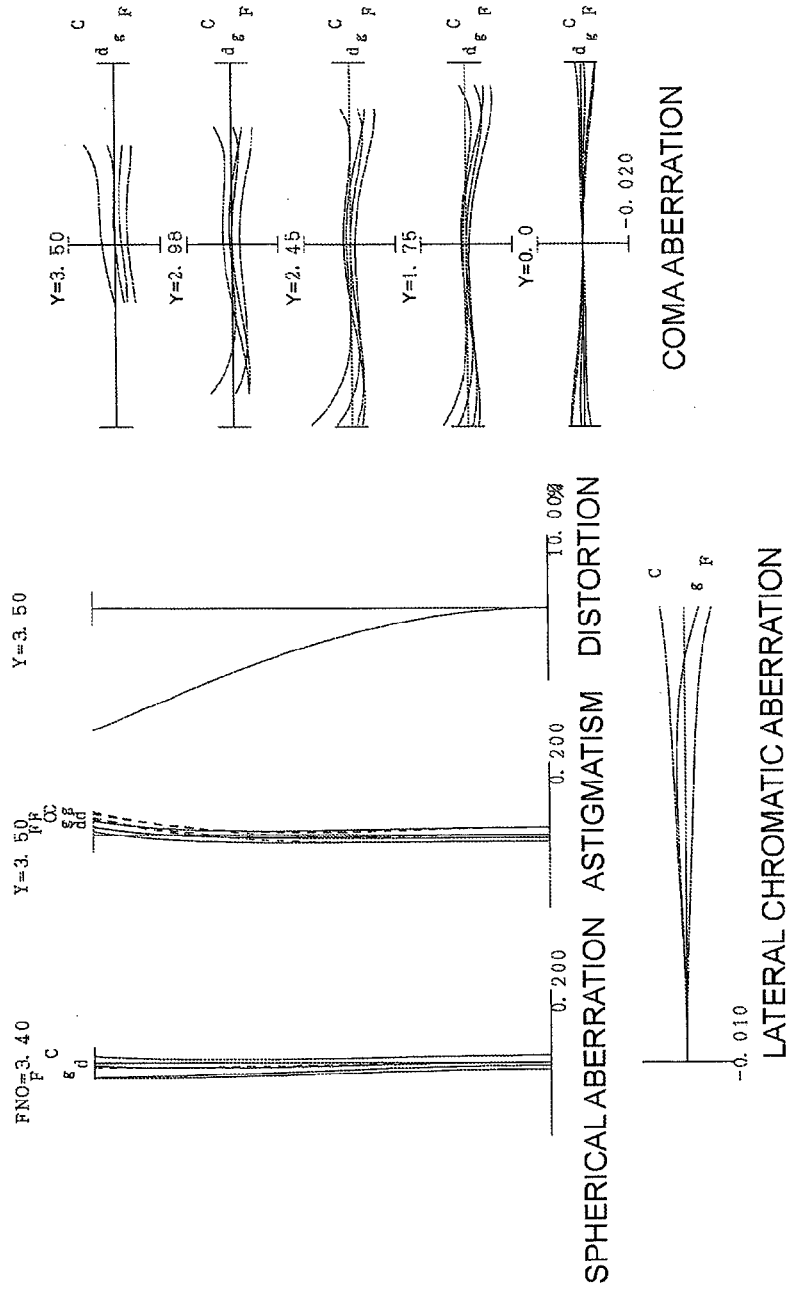
FIG. 8A are graphs showing various aberrations of the zoom lens according to Example 4 upon focusing on infinity in the wide-angle end state, FIG. 8B are graphs showing various aberrations of the zoom lens upon focusing on infinity in the intermediate focal length state, and FIG. 8C are graphs showing various aberrations of the zoom lens upon focusing on infinity in the telephoto end state.
Figure 8C:
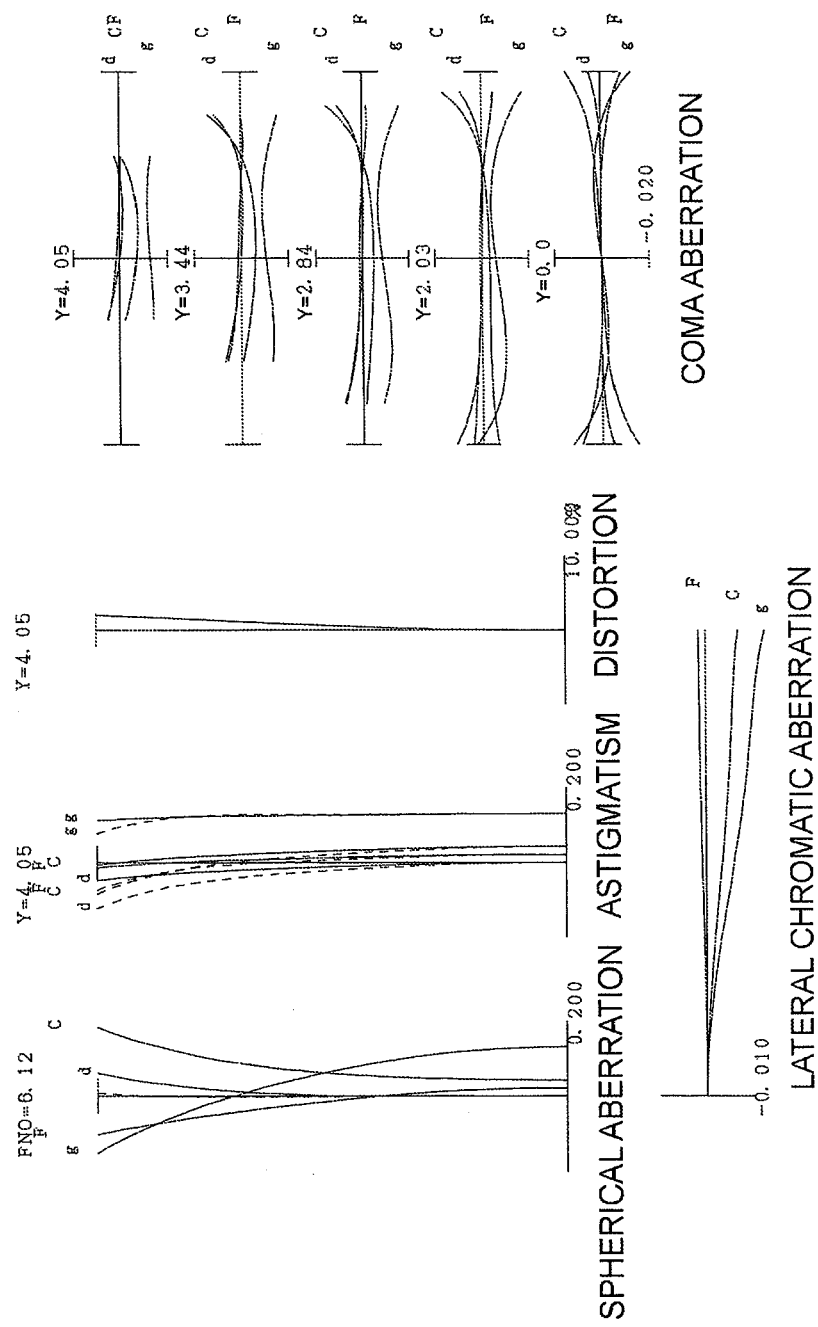

FIG. 8A to FIG. 8C are graphs showing various aberrations of the zoom lens ZL according to Example 4. FIG. 8A are graphs showing various aberrations of the zoom lens upon focusing on infinity in the wide-angle end state (f=4.63 mm), FIG. 8B are graphs showing various aberrations of the zoom lens upon focusing on infinity in the intermediate focal length state (f=26.47 mm), and FIG. 8C are graphs showing various aberrations of the zoom lens upon focusing on infinity in the telephoto end state (f=61.19 mm). As each graph showing aberrations clarifies, the zoom lens according to Example 4 has an excellent optical performance, where various aberrations are ideally corrected in each focal length state from the wide-angle end state to the telephoto end state. As a result, an excellent optical performance can be guaranteed for the digital still camera CAM as well, by installing the zoom lens ZL4 of Example 4.

According to each example, a zoom lens and an imaging apparatus (digital still camera), which is suitable for an electronic picture element with high pixels, and has compactness and excellent optical performance, even if the zoom ratio is high, can be implemented.

In the above embodiments, the following content can be adopted within a range where the optical performance is not diminished.

In each example, the zoom lens comprised of four lens groups, or five lens groups, was shown, but the present invention can also be applied to a configuration using a different number of lens groups, such as six groups. In the configuration, a lens or a lens group may be added to the side closest to the object, or a lens or a lens group may be added to the side closest to the image. A "lens group" refers to a portion having at least one lens isolated by an air space which changes upon zooming.

A single or a plurality of lens group(s) or a partial lens group may be designed to be a focusing lens group which performs focusing from an object at infinity to an object at short distance by moving in the optical axis direction. This focusing lens group can be applied to auto focus, and is also suitable for driving a motor for auto focusing (driving using an ultrasonic motor). It is particularly preferable that the fourth lens group is designed to be the focusing lens group.

A lens group or a partial lens group may be designed to be a vibration-isolating lens group, which corrects image blurs generated by hand motion by moving the lens group or the partial lens group in a direction perpendicular to the optical axis or rotating (oscillating) the lens group or the partial lens group in an in-plane direction including the optical axis. It is particularly preferable that at least a part of the third lens group is designed to be the vibration-isolating lens group. It is even better if the entire third lens group is designed to be the vibration-isolating lens group.

The lens surface may be formed to be a spherical surface or a plane, or an aspherical surface. If the lens surface is a spherical surface or a plane, lens processing, assembly and adjustment are easy, and deterioration of optical performance, due to an error in processing, assembly and adjustment can be prevented. Even if the image plane is shifted, the drawing performance is not affected very much, which is desirable. If the lens surface is an aspherical surface, the aspherical surface can be any aspherical surface out of an aspherical surface generated by grinding, a glass molded aspherical surface generated by forming glass in an aspherical shape using a die, and a composite aspherical surface generated by forming resin on the surface of the glass to be an aspherical shape. The lens surface may be a diffraction surface, and the lens may be a refractive index distributed lens (GRIN lens) or a plastic lens.

It is preferable that the aperture stop is disposed near the third lens group, but the role of the aperture stop may be substituted by the frame of the lens, without disposing a separate element as the aperture stop.

Each lens surface may be coated with an anti-reflection film which has high transmittance in a wide wavelength region, in order to decrease flares and ghosts, and implement a high optical performance with high contrast.

The zoom ratio of the zoom lens (zooming optical system) of the present embodiment is about 14.

The zoom lens of the present embodiment is used for a digital still camera, but the present invention is not limited to this, but may also be used for other imaging apparatuses, such as a digital video camera.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens comprising, in order from an object: a first lens group having positive refractive power; a second lens group having negative refractive power; a third lens group having positive refractive power; and a fourth lens group having positive refractive power, upon zooming from a wide-angle end state to a telephoto end state, the first lens group being moved, a distance between the first lens group and the second lens group being changed, a distance between the second lens group and the third lens group being changed and the fourth lens group being moved toward the object first, then moved toward an image, the third lens group including, in order from the object, a first positive lens, a negative lens and a second positive lens, the fourth lens group including two lens components, and the following conditional expressions being satisfied:

$$2.0 < f3/fw < 3.0$$

$$0.6 < (-f3b)/f3 < 0.9$$

where f3 denotes a focal length of the third lens group, fw denotes a focal length of the zoom lens in the wide-angle end state, and f3b denotes a focal length of the negative lens of the third lens group.

2. The zoom lens according to claim 1, wherein the following conditional expression is satisfied:

$$0.3 < f3/f4 < 0.6$$

Where f3 denotes a focal length of the third lens group, and f4 denotes a focal length of the fourth lens group.

3. The zoom lens according to claim 1, wherein the following conditional expression is satisfied:

$$1.0 < (-f2)/fw < 1.5$$

Where f2 denotes a focal length of the second lens group, and fw denotes a focal length of the zoom lens in the wide-angle end state.

4. The zoom lens according to claim 1, wherein the following conditional expression is satisfied:

$$1.0 < TLt/ft < 1.2$$

Where

TLt denotes a total length of the zoom lens in the telephoto end state, and ft denotes a focal length of the zoom lens in the telephoto end state.

5. The zoom lens according to claim 1, wherein the following conditional expression is satisfied:

$$1.0 < D1/fw < 1.6$$

Where
D1 denotes a thickness of the first lens group on the optical axis, and
fw denotes a focal length of the zoom lens in the wide-angle end state.

6. The zoom lens according to claim 1, wherein the following conditional expression is satisfied:

$$1.5 < f3c/f3a < 2.5$$

Where
f3c denotes a focal length of the second positive lens of the third lens group, and
f3a denotes a focal length of the first positive lens of the third lens group.

7. The zoom lens according to claim 1, wherein
the fourth lens group is formed of, in order from the object, a first lens component constituted by a positive lens and a second lens component constituted by a negative lens, and
at least one of the positive lens and the negative lens has an aspherical surface.

8. The zoom lens according to claim 1, wherein the following conditional expression is satisfied:

$$0.1 < (-f2)/f1 < 0.2$$

Where
f2 denotes a focal length of the second lens group, and
f1 denotes a focal length of the first lens group.

9. The zoom lens according to claim 1, wherein the fourth lens group includes a first lens component, and a second lens component that is disposed on the image side of the first lens component via an air space.

10. The zoom lens according to claim 9, wherein the following conditional expression is satisfied:

$$-11.5 < (R42a+R41b)/(R42a-R41b) < -3.5$$

Where
R41b denotes a paraxial radius of curvature of a lens surface closest to the image in the first lens component of the fourth lens group, and
R42a denotes a paraxial radius of curvature of a lens surface closest to the object in the second lens component of the fourth lens group.

11. The zoom lens according to claim 1, wherein
an aperture stop is disposed near the object side of the first positive lens of the third lens group, and
the third lens group and the aperture stop move together along the optical axis, upon zooming from the wide-angle end state to the telephoto end state.

12. The zoom lens according to claim 1, wherein at least a part of the third lens group can move so as to have a component in a vertical direction with respect to the optical axis.

13. The zoom lens according to claim 1, wherein the fourth lens group moves along the optical axis upon focusing from an object at infinity to an object at a finite distance.

14. An imaging apparatus comprising a zoom lens that forms an image of an object on a predetermined surface,
the zoom lens being the zoom lens according to claim 1.

15. A zoom lens comprising, in order from an object: a first lens group having positive refractive power; a second lens group having negative refractive power; a third lens group having positive refractive power; and a fourth lens group having positive refractive power,
upon zooming from a wide-angle end state to a telephoto end state, the first lens group being moved, a distance between the first lens group and the second lens group being changed, a distance between the second lens group and the third lens group being changed, and the fourth lens group being moved toward the object first, then moved toward an image,
the third lens group including, in order from the object, a first positive lens, a negative lens, and a second positive lens, and
the fourth lens group including a first lens component and a second lens component that is disposed on the image side of the first lens component via an air space.

16. The zoom lens according to claim 15, wherein the following conditional expression is satisfied:

$$-11.5 < (R42a+R41b)/(R42a-R41b) < -3.5$$

Where
R41b denotes a paraxial radius of curvature of a lens surface closest to the image in the first lens component of the fourth lens group, and
R42a denotes a paraxial radius of curvature of a lens surface closest to the object in the second lens component of the fourth lens group.

17. The zoom lens according to claim 15, wherein the following conditional expression is satisfied:

$$2.0 < f3/fw < 3.0$$

Where
f3 denotes a focal length of the third lens group, and
fw denotes a focal length of the zoom lens in the wide-angle end state.

18. The zoom lens according to claim 15, wherein the following conditional expression is satisfied:

$$0.6 < (-f3b)/f3 < 1.0$$

Where
f3 denotes a focal length of the third lens group, and
f3b denotes a focal length of the negative lens of the third lens group.

19. An imaging apparatus comprising a zoom lens that forms an image of an object on a predetermined surface,
the zoom lens being the zoom lens according to claim 15.

20. A method for manufacturing a zoom lens having, in order from an object: a first lens group having positive refractive power; a second lens group having negative refractive power; a third lens group having positive refractive power; and a fourth lens group having positive refractive power,
upon zooming from a wide-angle end state to a telephoto end state, the first lens group moved, a distance between the first lens group and the second lens group being changed, a distance between the second lens group and the third lens group being changed and the fourth lens group being moved toward the object first, then moved toward an image,
the third lens group including, in order from the object, a first positive lens, a negative lens and a second positive lens,
the fourth lens group including two lens components, and
the following conditional expressions being satisfied:

$$2.0 < f3/fw < 3.0$$

$$0.6 < (-f3b)/f3 < 0.9$$

Where
f3 denotes a focal length of the third lens group,
fw denotes a focal length of the zoom lens in the wide-angle end state, and
f3b denotes a focal length of the negative lens of the third lens group.

21. The method for manufacturing the zoom lens according to claim 20, wherein the following conditional expression is satisfied:

$$0.3 < f3/f4 < 0.6$$

Where
f3 denotes a focal length of the third lens group, and
f4 denotes a focal length of the fourth lens group.

22. The method for manufacturing the zoom lens according to claim 20, wherein the following conditional expression is satisfied:

$$1.0 < (-f2)/fw < 1.5$$

Where
f2 denotes a focal length of the second lens group, and
fw denotes a focal length of the zoom lens in the wide-angle end state.

23. The method for manufacturing the zoom lens according to claim 20, wherein the fourth lens group includes a first lens component, and a second lens component that is disposed on the image side of the first lens component via an air space.

24. A method for manufacturing a zoom lens having, in order from an object: a first lens group having positive refractive power; a second lens group having negative refractive power; a third lens group having positive refractive power; and a fourth lens group having positive refractive power, upon zooming from a wide-angle end state to a telephoto end state, the first lens group being moved, a distance between the first lens group and the second lens group being changed, a distance between the second lens group and the third lens group being changed, and the fourth lens group being moved toward the object first, then moved toward an image, the third lens group including, in order from the object, a first positive lens, a negative lens, and a second positive lens, and the fourth lens group including a first lens component and a second lens component that is disposed on the image side of the first lens component via an air space.

25. The method for manufacturing the zoom lens according to claim 24, wherein the following conditional expression is satisfied:

$$-11.5 < (R42a + R41b)/(R42a - R41b) < -3.5$$

Where
R41b denotes a paraxial radius of curvature of a lens surface closest to the image in the first lens component of the fourth lens group, and
R42a denotes a paraxial radius of curvature of a lens surface closest to the object in the second lens component of the fourth lens group.

* * * * *